US012726556B2

(12) United States Patent
Liu et al.

(10) Patent No.: US 12,726,556 B2
(45) Date of Patent: Sep. 1, 2026

(54) FOLDABLE ELECTRONIC DEVICE HAVING FLEXIBLE DISPLAY

(71) Applicant: Honor Device Co., Ltd., Shenzhen (CN)

(72) Inventors: Bo Liu, Shenzhen (CN); Ziyang Chen, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 687 days.

(21) Appl. No.: 18/253,409

(22) PCT Filed: Sep. 9, 2022

(86) PCT No.: PCT/CN2022/118095

§ 371 (c)(1),
(2) Date: May 18, 2023

(87) PCT Pub. No.: WO2023/051218

PCT Pub. Date: Apr. 6, 2023

(65) Prior Publication Data

US 2024/0007550 A1 Jan. 4, 2024

(30) Foreign Application Priority Data

Sep. 29, 2021 (CN) .......................... 202111152373.7

(51) Int. Cl.
*H04M 1/02* (2006.01)

(52) U.S. Cl.
CPC ....... *H04M 1/0214* (2013.01); *H04M 1/0268* (2013.01); *H04M 1/0277* (2013.01)

(58) Field of Classification Search
CPC ...... H04M 1/026; H04M 1/0264; H04M 1/03; H04M 2250/16; H04M 1/0212; H04M 1/0266; H04M 1/0214; H04M 1/0268; H04M 1/0277
See application file for complete search history.

(56) References Cited

U.S. PATENT DOCUMENTS 10,205,811 B2 2/2019 Zheng et al.
2017/0006738 A1* 1/2017 Lee ......................... G06F 1/203
2017/0099742 A1* 4/2017 Choi ......................... H05K 5/03
2023/0051260 A1* 2/2023 An ......................... H04M 1/18
(Continued)

FOREIGN PATENT DOCUMENTS

CA 2778860 A1 11/2013
CN 205812104 U * 12/2016
(Continued)

*Primary Examiner* — Angelica Perez
(74) *Attorney, Agent, or Firm* — Conley Rose, P.C.

(57) ABSTRACT

An electronic device resolves problems of a complex detachment process and high detachment costs of a first display of a dual screen mobile phone in the conventional technology. The electronic device includes the first display, a second display, and a mainboard located between the two displays. The first flexible printed circuit board on the first display is electrically connected to a surface that is of the mainboard and that faces the first display, and the second flexible printed circuit board on the second display is electrically connected to a surface that is of the mainboard and that faces the second display. Therefore, neither of the two flexible printed circuit boards is wound around two sides of the mainboard.

20 Claims, 15 Drawing Sheets

(56) References Cited

U.S. PATENT DOCUMENTS

| | | | | |
|---|---|---|---|---|
| 2023/0080404 A1* | 3/2023 | Cui | .......................... | G09F 9/30 |
| | | | | 361/807 |
| 2023/0421681 A1* | 12/2023 | Cai | ......................... | H05K 1/14 |

FOREIGN PATENT DOCUMENTS

| | | | | | |
|---|---|---|---|---|---|
| CN | 206282195 U | | 6/2017 | | |
| CN | 106973170 A | | 7/2017 | | |
| CN | 208724296 U | | 4/2019 | | |
| CN | 110417943 A | | 11/2019 | | |
| CN | 209608933 U | | 11/2019 | | |
| CN | 112421321 A | | 2/2021 | | |
| CN | 112433402 A | * | 3/2021 | ......... | G02F 1/13336 |
| CN | 213783702 U | | 7/2021 | | |
| CN | 115022427 A | | 9/2022 | | |

* cited by examiner 30a
40a
90a
20a
21a

FOLDABLE ELECTRONIC DEVICE HAVING FLEXIBLE DISPLAY

CROSS-REFERENCE TO RELATED APPLICATIONS

This application is a U.S. National Stage of International Application No. PCT/CN2022/118095 filed on Sep. 9, 2022, which claims priority to Chinese Patent Application No. 202111152373.7, filed with the China National Intellectual Property Administration on Sep. 29, 2021, both of which are incorporated herein by reference in their entireties.

TECHNICAL FIELD

Embodiments of this application relate to the field of terminal technologies, and in particular, to an electronic device.

BACKGROUND

With rapid development of terminal device technologies, an electronic device with only one display cannot meet a requirement of a user in different scenarios. Therefore, an electronic device with two screens, such as a dual screen mobile phone, is proposed in a related technology.

Currently, a dual screen mobile phone is usually provided with a middle frame, a first display, and a second display, and the first display and the second display are respectively disposed on two sides of the middle frame. The dual screen mobile phone further includes electronic elements such as a mainboard, a speaker, and a battery. The electronic elements such as the mainboard, the speaker, and the battery are all built in between the first display and the second display, and both the first display and the second display are electrically connected to the mainboard. Specifically, a flexible printed circuit board (Flexible Printed Circuit board; FPC) is disposed on the first display. The flexible printed circuit board is wound around a surface that is of the mainboard and that faces the second display, and is electrically connected to the surface that is of the mainboard and that faces the second display. In addition, the second display is also connected to the surface that is of the mainboard and that faces the second display.

However, in the foregoing dual screen mobile phone, when the first display is faulty and needs to be repaired or replaced, the second display, the mainboard, and components located between the mainboard and the second display all need to be detached. A detachment process is complex, and the electronic elements such as the second display and the mainboard may be easily damaged in the detachment process. This results in high detachment costs.

SUMMARY

Embodiments of this application provide an electronic device, so as to resolve problems of a complex detachment process and high detachment costs of a first display of a dual screen mobile phone in the conventional technology.

An embodiment of this application provides an electronic device, including a middle frame, a first display, a second display, a mainboard, a first flexible printed circuit board, and a second flexible printed circuit board.

A middle frame includes a middle plate and a frame connected to a circumferential edge of the middle plate, where an opening is disposed on the middle plate.

A first display and a second display are respectively disposed on two sides of the middle plate, and the mainboard is mounted on the middle plate and faces the opening.

One end of the first flexible printed circuit board is connected to a surface that is of the first display and that faces the middle plate, and the other end of the first flexible printed circuit board extends between the first display and the mainboard and is electrically connected to a surface that is of the mainboard and that faces the first display.

One end of the second flexible printed circuit board is connected to a surface that is of the second display and that faces the middle plate, and the other end of the second flexible printed circuit board extends between the second display and the mainboard and is electrically connected to a surface that is of the mainboard and that faces the second display.

The electronic device provided in this embodiment of this application includes two displays, namely the first display and the second display, and the mainboard located between the two displays. The first flexible printed circuit board on the first display is electrically connected to the surface that is of the mainboard and that faces the first display, and the second flexible printed circuit board on the second display is electrically connected to the surface that is of the mainboard and that faces the second display. That is, neither of the two flexible printed circuit boards is wound around two sides of the mainboard. In this way, when the first display needs to be repaired or replaced due to crack, scraping, poor contact, or another reason, the first display may be directly pulled to move away from a direction of the mainboard, and components such as the second display and the mainboard do not need to be detached, and a detachment process is simple. In addition, this prevents electronic elements such as the mainboard and the second display from being damaged due to collision or scraping in the detachment process, thereby avoiding high repair costs.

In a possible implementation, the electronic device further includes a locking bracket disposed between the mainboard and the first display, where the locking bracket is detachably connected to the middle frame, and the locking bracket is in contact with a surface that is of the first flexible printed circuit board and that faces the first display.

In a possible implementation, a first mounting base and a second mounting base protrude from the middle plate, the first mounting base and the second mounting base are disposed on two sides opposite to the opening, and two ends of the locking bracket are detachably connected to the first mounting base and the second mounting base, respectively.

In a possible implementation, each of the first mounting base and the second mounting base, and the middle plate form an integrated component by using an integrated molding process.

In a possible implementation, the first flexible printed circuit board is connected to the surface that is of the mainboard and that faces the first display by using a connector, the connector includes a male socket and a female socket, the male socket is disposed on a surface that is of the first flexible printed circuit board and that faces the mainboard, and the female socket is disposed on the surface that is of the mainboard and that faces the first display, and the female socket is inserted into the male socket; and a clamping gap is jointly defined between the locking bracket and the mainboard, and the first flexible printed circuit board and the connector are clamped in the clamping gap.

In a possible implementation, the electronic device further includes a cover plate disposed between the mainboard and the second display, where the cover plate covers on the mainboard.

In a possible implementation, the first flexible printed circuit board includes a bent segment and a connection segment that are connected, one end that is of the bent segment and that is away from the connection segment is connected to the first display, and the connection segment is electrically connected to the surface that is of the mainboard and that faces the first display.

In a possible implementation, both the bent segment and the connection segment are located between the mainboard and the first display.

In a possible implementation, the electronic device further includes a functional component, where the functional component and the mainboard are located on a same side of the middle plate, the functional component and the mainboard are disposed side by side along a length direction of the electronic device, and the bent segment and a part of connection segment are disposed between the functional component and the first display.

In a possible implementation, the mainboard and the second display are located on a same side of the middle plate, the functional component faces the opening, a protruding portion is disposed on a surface that is of the functional component and that faces the first display, the protruding portion extends from the opening to a side that is of the middle plate and that faces the first display, a surface that is of the functional component and that faces the first display and the protruding portion jointly define a step surface, the step surface and the first display are jointly enclosed into an avoidance groove, and the bent segment is disposed in the avoidance groove.

In a possible implementation, the bent segment is located on a side that is of the protruding portion and that is away from the mainboard, the connection segment extends from a position between the protruding portion and the first display to a position between the mainboard and the first display, and a surface that is of the connection segment and that faces the mainboard is attached to the protruding portion.

In a possible implementation, the first flexible printed circuit board includes a fastening segment, the fastening segment is connected to a surface that is of the first display and that faces the mainboard, and the fastening segment is connected to the one end that is of the bent segment and that is away from the connection segment.

In a possible implementation, the functional component is a camera, or the functional component is a speaker.

In a possible implementation, the bent segment is arc-shaped, or the bent segment has a bent angle.

In a possible implementation, the electronic device further includes a battery, where the battery and the mainboard are disposed on a same side of the middle plate, and the battery is electrically connected to the mainboard.

In a possible implementation, the electronic device further includes a rear cover, where the rear cover and the second display are located on a same side of the middle plate; and the battery is disposed between the back cover and the first display, or the battery is disposed between the first display and the second display.

In a possible implementation, the first display is a flexible display that can be folded, the middle frame includes a first structural member, a rotating assembly, and a second structural member, and the first structural member is rotatably connected to the second structural member by using the rotating assembly.

DESCRIPTION OF REFERENCE NUMERALS

100. Electronic device;

10. Middle frame; 11. First structural member; 12. Second structural member; 13. Rotating assembly; 14. Middle plate; 140. Opening; 141. First recess; 142. Second recess; 143. Mounting base; 1430. Screw hole; 15. Frame;

20. First display; 21. First flexible printed circuit board; 210. Fastening segment; 211. Bent segment; 212. Connection segment;

30. Second display; 31. Second flexible printed circuit board; 310. Bent segment; 311. Mounting segment;

40. Mainboard; 401. First surface; 402. Second surface; 41. Electronic element; 42. Connector; 420. Female socket; 421. Male socket;

50. Locking bracket; 51. First plate body; 52, Second plate body; 53. Middle plate body; 54. Through hole;

60. Cover plate;

70. Battery;

80. Rear cover;

90. Functional component; 91. Protruding portion; 92. Avoidance groove.

DESCRIPTION OF EMBODIMENTS

Figures 1, 2:
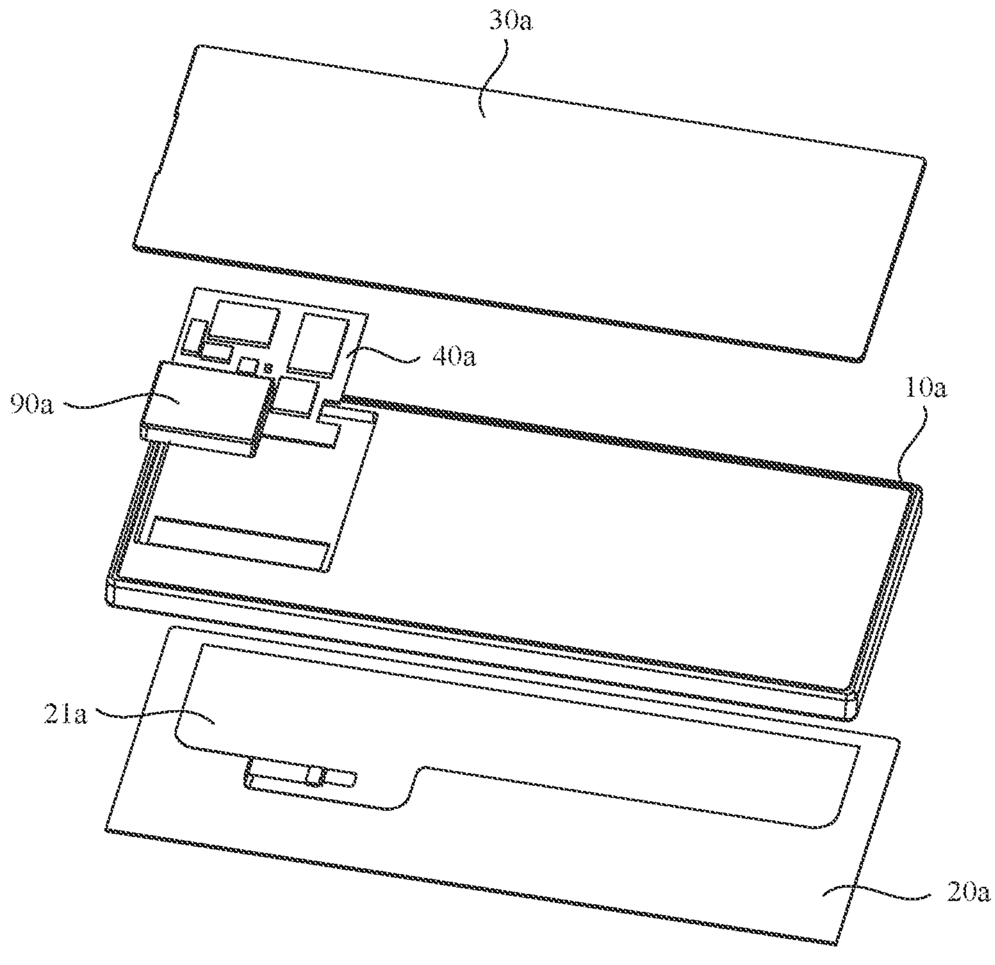
FIG. 1 is a schematic diagram of breakdown of a dual screen mobile phone in a related technology.
FIG. 2 is a three-dimensional sectional view of a dual screen mobile phone in a related technology.

To meet differentiated needs of users, an electronic device with two screens has emerged. FIG. 1 schematically shows a breakdown structure of a dual screen mobile phone in a related technology; and FIG. 2 schematically shows a cross-sectional structure of a dual screen mobile phone in a related technology. Referring to FIG. 1 and FIG. 2, the dual screen mobile phone provided in the related technology includes a middle frame 10*a*, a first display 20*a*, and a second display 30*a*. The first display 20*a* and the second display 30*a* are respectively disposed on two sides of the middle frame 10*a*, and both the first display 20*a* and the second display 30*a* can be used to display an image. The mobile phone further includes electronic elements such as a mainboard 40*a* and a speaker 90*a*. The mainboard 40*a* and the speaker 90*a* are located between the first display 20*a* and the second display 30*a*, and the mainboard 40*a* and the speaker 90*a* are disposed side by side along a length direction of the mobile phone. A surface that is of the first display 20*a* and that faces the mainboard 40*a* is connected to a flexible printed circuit board 21*a*, and the flexible printed circuit board 21*a* is wound from a side that is of the mainboard 40*a* and that faces the first display 20*a*, from between the mainboard 40*a* and the speaker 90*a*, to a side that is of the mainboard 40*a* and that is away from the first display 20*a*, and is electrically connected to a surface that is of the mainboard 40*a* and that faces the second display 30*a*. In addition, the second display 30*a* is also electrically connected to the surface that is of the mainboard 40*a* and that faces the second display 30*a*. That is, the first display 20*a* and the second display 30*a* are electrically connected to a same surface of the mainboard 40*a*, and the flexible printed circuit board 21*a* surrounds a part of the mainboard 40*a* from a side of the mainboard 40*a*.

A mounting process of the dual screen mobile phone is as follows: The first display 20*a* is mounted on a side of the middle frame 10*a*, and then the mainboard 40*a* is mounted on a side that is of the first display 20*a* and that faces the middle frame 10*a*, so that the flexible printed circuit board 21*a* on the first display 20*a* is wound around a side that is of the mainboard 40*a* and that is away from the first display 20*a* for connection, and the speaker 90*a* is mounted on a side that is of the first display 20*a* and that faces the middle frame 10*a*, and then a second display 30*a* is mounted on the other side of the middle frame 10*a*.

However, when the first display 20*a* of the foregoing dual screen mobile phone is faulty and needs to be repaired or replaced, the second display 30*a* and the speaker 90*a* first need to be sequentially detached, and then a connection relationship between the mainboard 40*a* and the flexible printed circuit board 21*a* needs to be released, and the mainboard 40*a* needs to be detached, and then the first display 20*a* needs to be detached. In general, in the related technology, components located on a side that is of the first display 20*a* and that faces the middle frame 10*a* need to be detached from the dual screen mobile phone before the first display 20*a* can be removed. In this way, a detachment process is cumbersome, in addition, in the detachment process, electronic elements such as the second display 30*a*, the mainboard 40*a*, and the speaker 90*a* may be easily scraped or damaged because of a collision, and consequently, electronic elements such as the second display 30*a*, the mainboard 40*a*, and the speaker 90*a* also need to be replaced, and repair costs are high, and when the electronic elements are assembled after repair, precision of cooperation between the electronic elements cannot be easily ensured.

After careful research, researchers have found that a main reason for a complex detachment process in the related technology is that, when the flexible printed circuit board on the first display is wound around two sides of the mainboard and directly pulls the first display along a direction away from the mainboard, the flexible printed circuit board drives the mainboard to move, and a mounting position of the mainboard and a connection relationship between the mainboard and the second display are affected. Therefore, components that are located on a side that is of the first display and that faces the middle frame need to be detached before the first display can be removed. Based on this, the researchers have thought that both the first display and the second display are designed to be connected to a surface that is opposite to the mainboard, so that no flexible printed circuit board is wound around two sides of the mainboard. In this way, when the electronic elements such as the mainboard, the speaker, and the second display are not detached, the first display can be moved directly along a direction away from the mainboard, so that the first display can be directly detached, a detachment process is simplified, and the electronic elements such as the mainboard and the second display can be prevented from being damaged during detachment.

The following describes in detail an implementation of an electronic device provided in this embodiment of this application.

Figure 3:
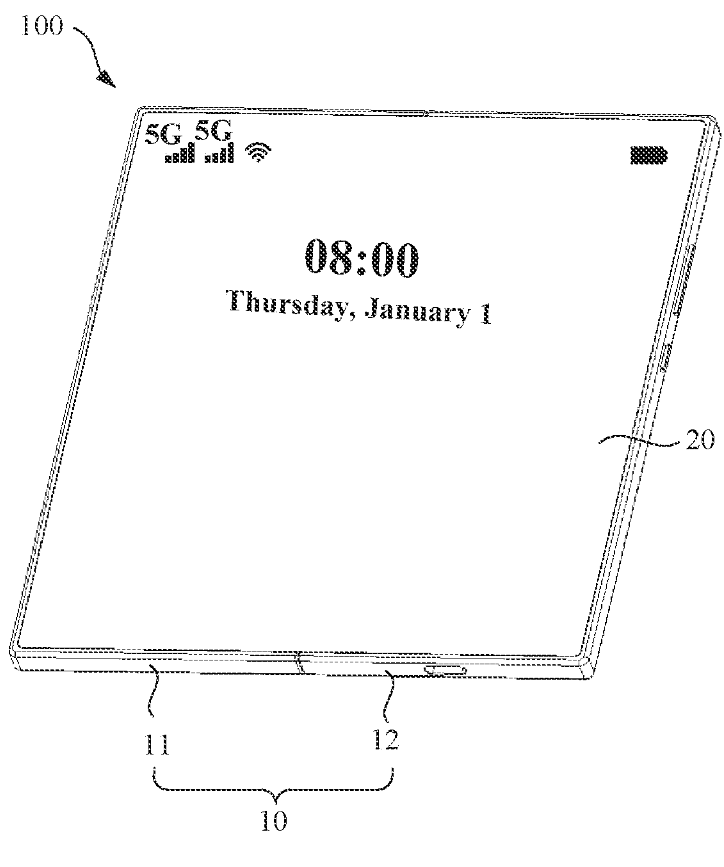
FIG. 3 is a schematic diagram of a structure of a front surface of a foldable dual screen mobile phone in an unfolded state according to an embodiment of this application.
Figure 4:
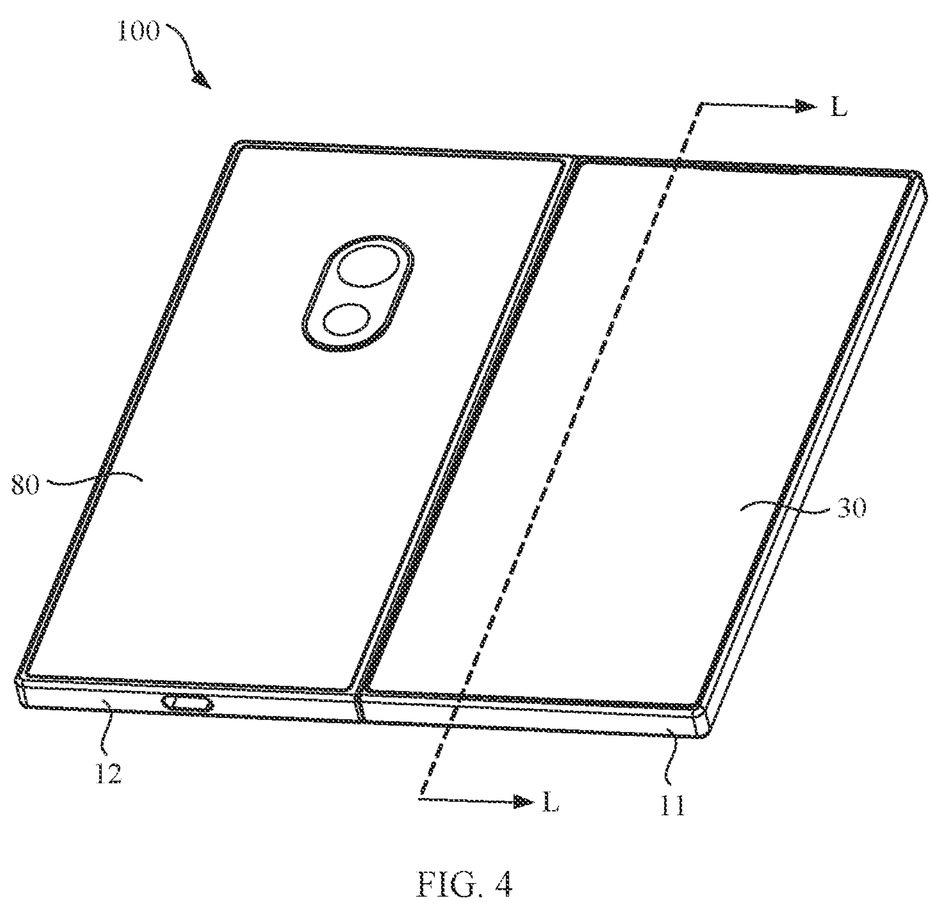
FIG. 4 is a schematic diagram of a structure of a rear surface of a foldable dual screen mobile phone in an unfolded state according to an embodiment of this application.

FIG. 3 and FIG. 4 schematically show a structure of a foldable dual screen mobile phone in an unfolded state. Referring to FIG. 3 and FIG. 4, an embodiment of this application provides an electronic device 100 with two screens, which may include, but is not limited to, a foldable fixed terminal or mobile terminal such as a mobile phone, a tablet computer, a notebook computer, an ultra-mobile personal computer (ultra-mobile personal computer, UMPC), a handheld computer, a touch T, a walkie-talkie, a netbook, a POS terminal, a personal digital assistant (personal digital assistant, PDA), a wearable device, or a virtual reality device. In this embodiment of this application, an example in which the electronic device 100 is a mobile phone is used for description.

The electronic device 100 may include a middle frame 10, a first display 20, and a second display 30. The middle frame 10 is configured to carry the first display 20 and the second display 30. The middle frame 10 includes a middle plate 14 (as shown in the following FIG. 8) and a frame 15 (as shown in the following FIG. 8), and the frame 15 is connected to an entire circumferential edge of the middle plate 14. The middle plate 14 may be a metal middle plate 14 made of a metal material such as aluminum or magnesium. The first display 20 and the second display 30 are respectively disposed on two sides of the metal middle plate 14, and are connected to the metal middle plate 14 in a manner such as bonding.

Each of the first display 20 and the second display 30 may be an organic light-emitting diode (Organic Light-Emitting Diode, OLED) display or a liquid crystal display (Liquid Crystal Display, LCD). Alternatively, in some embodiments, one of the first display 20 and the second display 30 may be the OLED display or the LCD, the other of the first display 20 and the second display 30 may be an E-Ink ink screen, the OLED display or the LCD has high resolution, and the E-Ink ink screen has low reflectivity. Therefore, the user may use the OLED display or the LCD to view an image and read by using the E-Ink ink screen, to avoid damage to eyesight due to use of the OLED display or the LCD for reading for a long time.

Sizes of the first display 20 and the second display 30 may be the same or may be different. For example, a size of the second display 30 may be smaller than a size of the first display 20, and the first display 20 and the second display 30 can switch to display, to implement switching of the size of the screen. In this way, when the power of the electronic device 100 is relatively low, the user may use the second display 30 to reduce power consumption of the electronic device 100.

Figure 5:
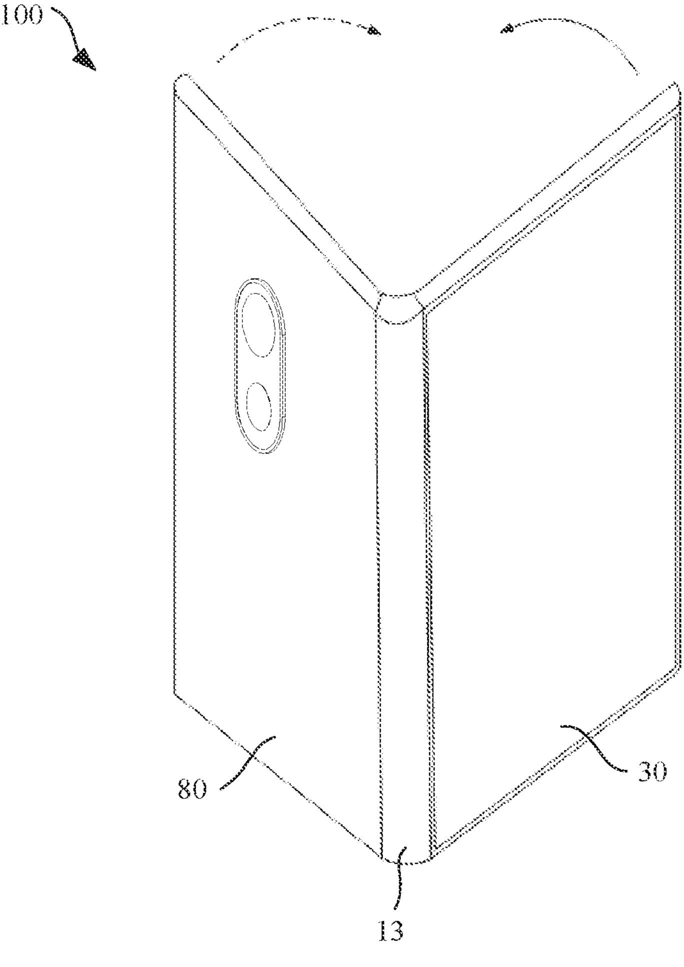
FIG. 5 is a schematic diagram of a structure of a foldable dual screen mobile phone in a semi-folded state according to an embodiment of this application.

The first display 20 and the second display 30 each may be a flexible display that can be folded, and the middle frame 10 may also be folded, so that the electronic device 100 can be folded. FIG. 5 schematically shows a structure of a foldable mobile phone in a semi-folded state. As shown in FIG. 5, the middle frame 10 includes a first structural member 11, a second structural member 12, and a rotating assembly 13 disposed between the first structural member 11 and the second structural member 12. Both the first structural member 11 and the second structural member 12 are rotatably connected to the rotating assembly 13, so that the first structural member 11 and the second structural member 12 can rotate relative to the rotating assembly 13. In this embodiment of this application, the first structural member 11 may be a first middle frame, and the second structural member 12 may be a second middle frame. Therefore, the first structural member 11 and the second structural member 12 each may include a middle plate 14 and a frame 15.

Figure 6:
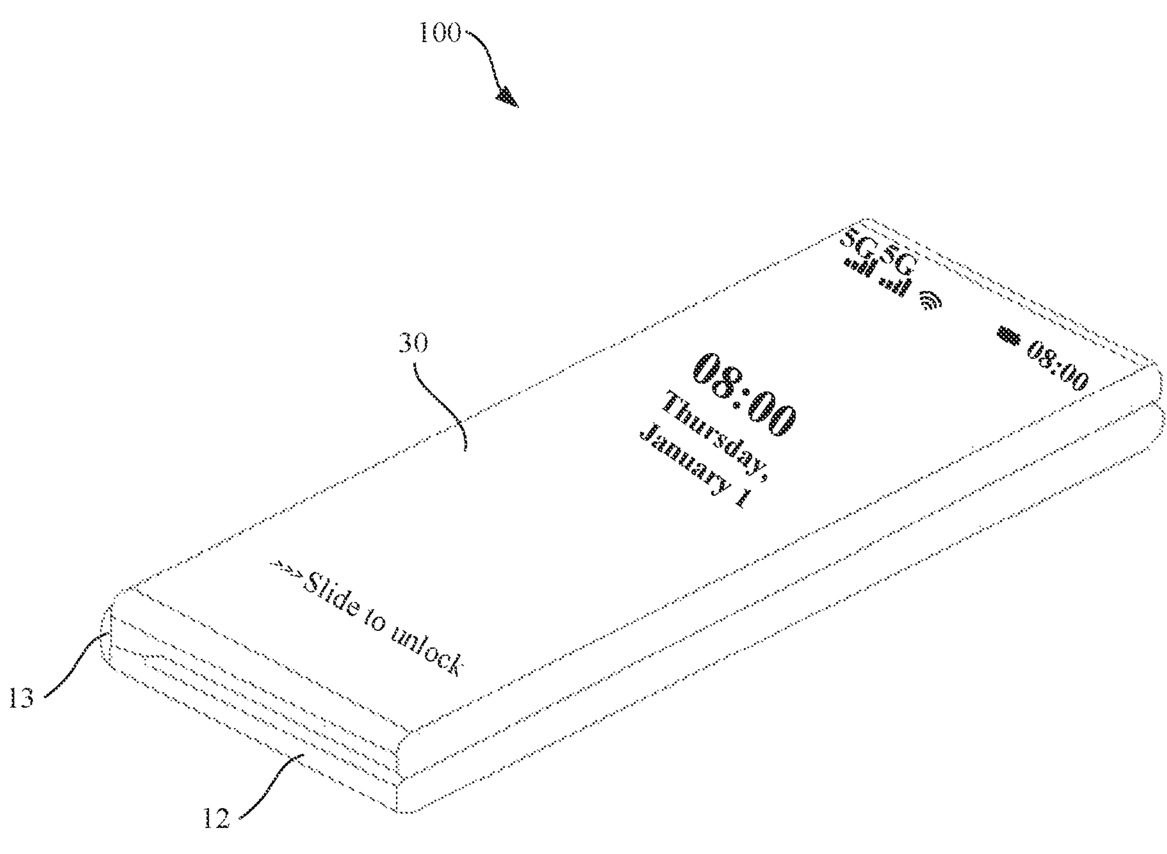
FIG. 6 is a schematic diagram of a structure of a foldable dual screen mobile phone in a folded state according to an embodiment of this application.

FIG. 6 schematically shows a structure of a foldable mobile phone in a folded state. In the example shown in FIG. 6, the first display 20 is a flexible display, a size of the second display 30 is smaller than that of the first display 20, and the first structural member 11 and the second structural member 12 can rotate toward each other to be stacked on each other. In this case, the first display 20 can be bent and attached between the first structural member 11 and the second structural member 12, the second display 30 is exposed outside to display an image, and the mobile phone is in a folded state (for example, as shown in FIG. 5). The first structural member 11 and the second structural member 12 may further rotate away from each other from a stacked state to a state in which the first structural member 11 and the second structural member 12 are on a same plane. In this case, the first display 20 unfolds, and the mobile phone is in an unfolded state (for example, as shown in FIG. 3).

With reference to the foregoing description, it may be learned that the dual screen electronic device 100 provided in this embodiment may be an electronic device 100 that cannot be folded, or may be an electronic device 100 that can be folded.

Figure 7:
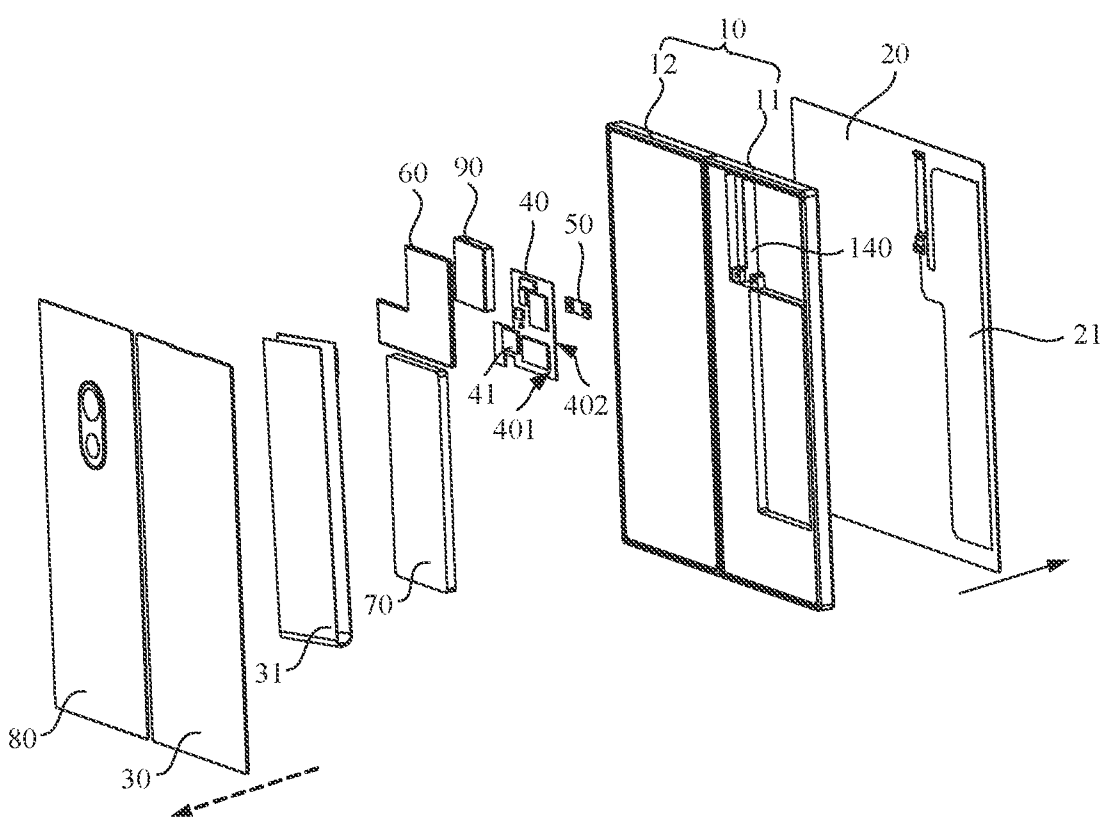
FIG. 7 is a schematic diagram of breakdown of a foldable dual screen mobile phone according to an embodiment of this application.

FIG. 7 schematically shows a breakdown structure of an electronic device 100 according to an embodiment. Referring to FIG. 7, the electronic device 100 further includes a mainboard 40. The mainboard 40 is mounted on the middle plate 14, and is disposed in parallel with the first display 20 and the second display 30. The mainboard 40 may be disposed on a side that is of the middle plate 14 and that faces the first display 20, or may be disposed on a side that is of the middle plate 14 and that faces the second display 30. The mainboard 40 may be a circuit board made of a flexible material, or may be a rigid printed circuit board (Printed Circuit Board; PCB). An electronic element 41 is disposed on the mainboard 40, and the electronic element 41 may be any one or more of a power amplifier, a central processing unit (Central Processing Unit; CPU), a power management integrated circuit (Power Management IC; PMIC), a universal flash storage (Universal Flash Storage; UFS), and an image signal processor (Image Signal Processor; ISP).

The mainboard 40 is a double-sided board. The mainboard 40 has a first surface 401 and a second surface 402 that are disposed facing away from each other, and electronic elements 41 may be disposed on both the first surface 401 and the second surface 402. The first surface 401 refers to a surface that is of the mainboard 40 and that faces the first display 20. On the contrary, the second surface 402 refers to a surface that is of the mainboard 40 and that faces the second display 30.

The mainboard 40 is electrically connected to both the first display 20 and the second display 30, to supply power to the first display 20 and the second display 30. A specific implementation is as follows: A first flexible printed circuit board 21 is disposed on a non-display surface of the first display 20, and the other end that is of the first flexible printed circuit board 21 and that is away from the first display 20 extends between the first display 20 and the mainboard 40, and is electrically connected to the first surface 401 of the mainboard 40; and a second flexible printed circuit board 31 is disposed on a non-display surface of the second display 30, and the other end that is of the second flexible printed circuit board 31 and that is away from the second display 30 extends between the second display 30 and the mainboard 40, and is electrically connected to the second surface 402 of the mainboard 40. The non-display surface of the first display 20 refers to a surface that is of the first display 20 and that faces the mainboard 40 and that is away from the outside, and the non-display surface of the second display 30 refers to a surface that is of the second display 30 and that faces the mainboard 40 and that faces the outside. The first flexible printed circuit board 21 and the second flexible printed circuit board 31 each is a printed circuit board made of a flexible insulation material, has relatively high flexibility, and can be freely bent, wound, and folded, so that the first flexible printed circuit board 21 can be bent and extend between the first display 20 and the mainboard 40, and the second flexible printed circuit board 31 can be bent and extend between the second display 30 and the mainboard 40.

Figure 8:
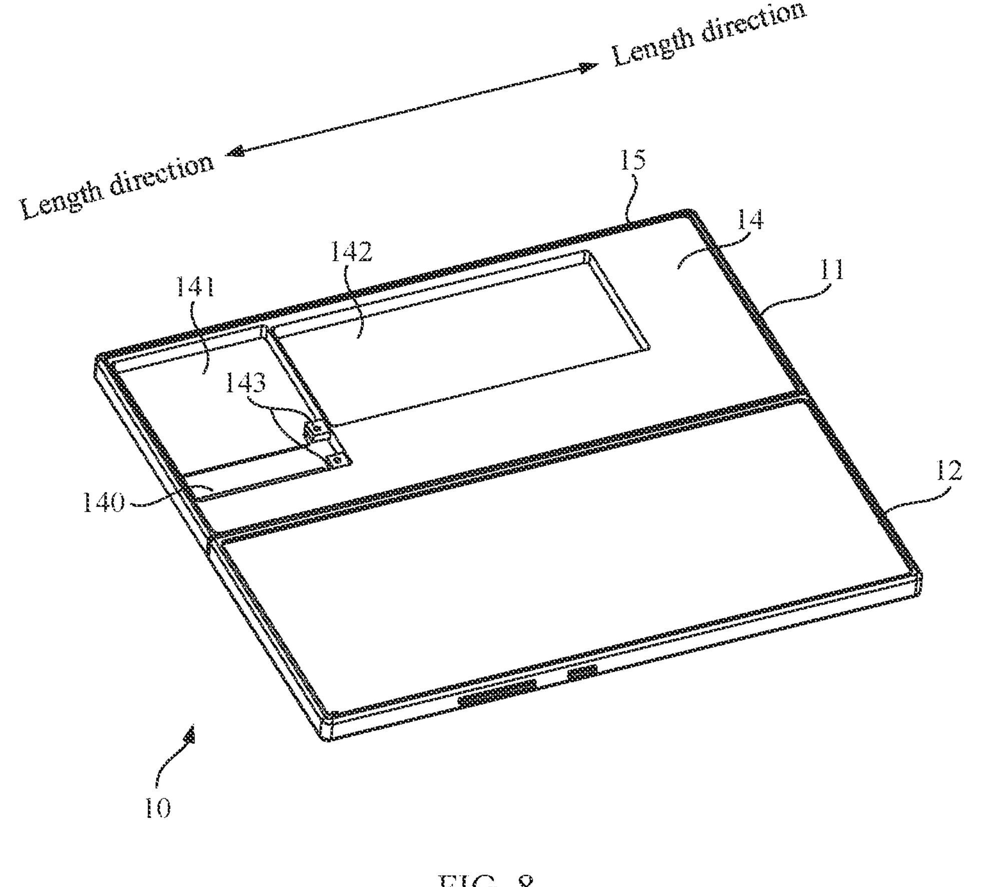
FIG. 8 is a schematic diagram of a structure of a middle frame of an electronic device according to an embodiment of this application.
Figure 9:
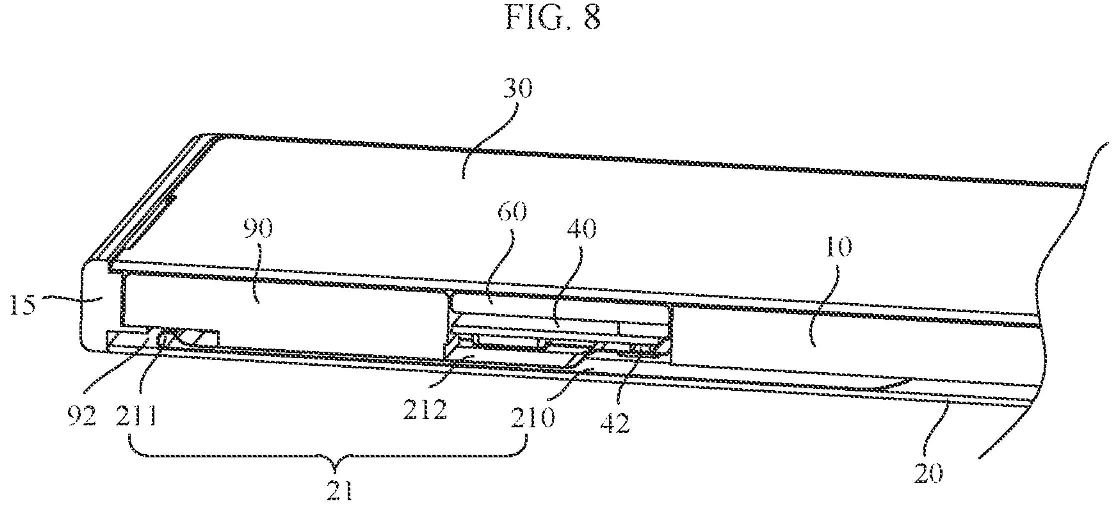
FIG. 9 is a schematic sectional view of an electronic device taken along a direction L-L in FIG. 4 according to an embodiment of this application.
Figure 10:
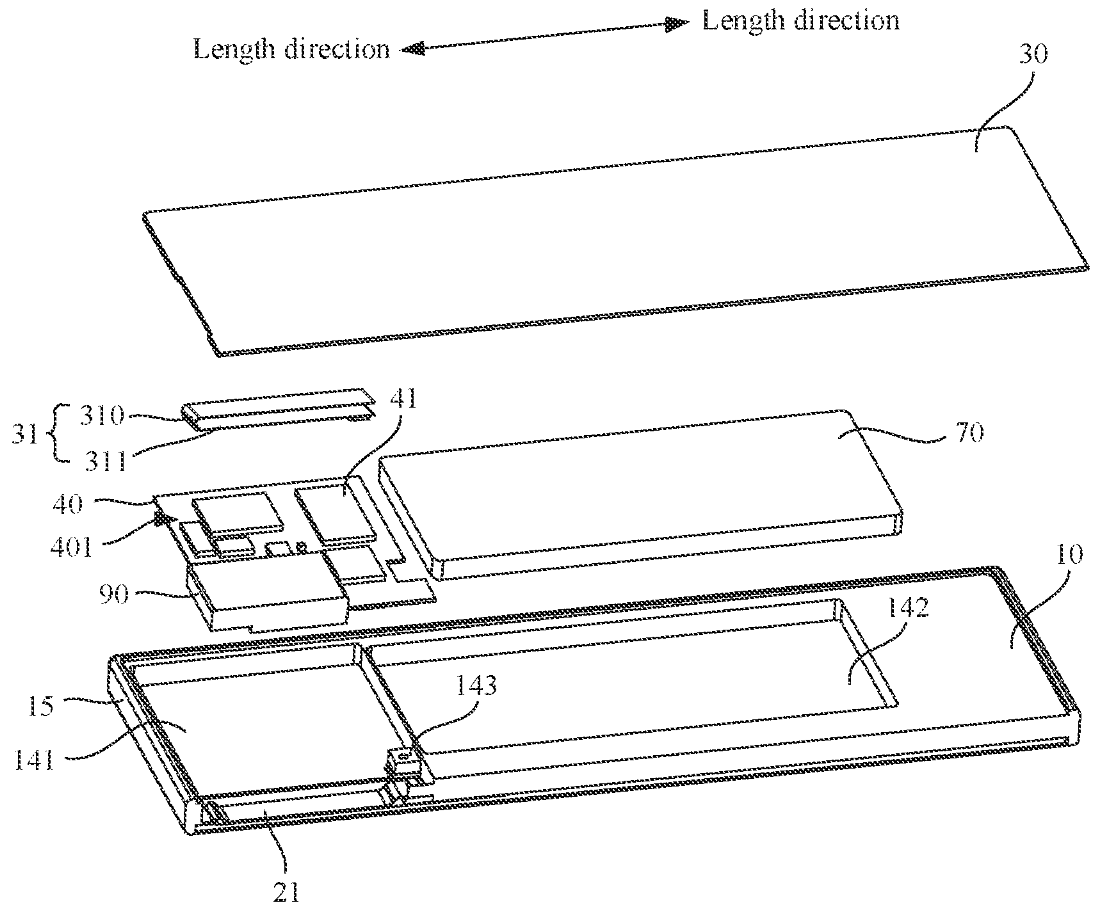
FIG. 10 is a schematic sectional view of a breakdown structure of an electronic device taken along a direction L-L in FIG. 4 according to an embodiment of this application.

FIG. 8 schematically shows a three-dimensional structure of a middle frame 10. It should be noted that, as shown in FIG. 8, an opening 140 is disposed on the middle plate 14, and a part of the mainboard 40 directly faces the opening 140, to ensure that the first flexible printed circuit board 21 and the second flexible printed circuit board 31 that are located on two sides of the middle plate 14 can be connected to the mainboard 40. Specifically, when the mainboard 40 is disposed on a side that is of the middle plate 14 and that faces the first display 20, the second flexible printed circuit board 31 can extend into the opening 140 to connect the second surface 402 of the mainboard 40. Similarly, referring to FIG. 9 and FIG. 10, when the mainboard 40 is disposed on a side that is of the middle plate 14 and that faces the second display 30, the first flexible printed circuit board 21 can extend into the opening 140 to connect the first surface 401 of the mainboard 40. FIG. 9 schematically shows a schematic sectional view of an electronic device 100 taken along a direction L-L in FIG. 4; and FIG. 10 schematically shows a schematic sectional view of a breakdown structure of an electronic device 100 taken along a direction L-L in FIG. 4. A shape of the opening 140 is not limited. The opening 140 may be in a regular shape such as a circular shape, a square, a rectangle, or a rounded rectangle, or may be in another irregular shape.

It may be learned from the foregoing description that, in this embodiment, both the first flexible printed circuit board 21 and the second flexible printed circuit board 31 of the electronic device 100 are connected to a surface that is opposite to the mainboard 40, and neither of the first flexible printed circuit board 21 and the second flexible printed circuit board 31 is wound around two sides of the mainboard 40. In this way, when the first display 20 needs to be repaired or replaced due to crack, scraping, poor contact, or another reason, an example of the detachment process of the first display 20 may be as follows: A connection relationship between the first display 20 and the middle frame 10 is released, the first display 20 is moved in a positive direction (a direction shown by a solid arrow in FIG. 7) of the electronic device 100 to move away from the mainboard 40, the first flexible printed circuit board 21 extends with movement of the first display 20; and a connection relationship between the flexible printed circuit board 21 and the mainboard 40 is released, so that the first display 20 is detached from the mainboard 40. The positive direction of the electronic device 100 refers to a direction that is of the first display 20 and that faces the user when the electronic device 100 is in an unfolded state. On the contrary, a reverse direction of the electronic device 100 (a direction shown by a dashed arrow in FIG. 7) refers to a direction that is of the second display 30 and that faces the user when the electronic device 100 is in an unfolded state.

On the contrary, after repair of the first display 20 is completed, a process of reassembling the first display 20 on the middle frame 10 is as follows. The first display 20 is moved to a side of the middle frame 10, the first flexible printed circuit board 21 is connected to the first surface 401 of the mainboard 40, and then the first display 20 is connected to the middle frame 10.

It may be understood that no second flexible printed circuit board 31 is wound around two sides of the mainboard 40. Therefore, when the second display 30 needs to be repaired or replaced due to crack, scraping, poor contact, or another reason, the second display 30 can be directly detached from the reverse direction of the electronic device 100. Certainly, for the electronic device 100 provided in this embodiment, first, the second display 30 and the mainboard 40 may be sequentially detached and then the first display 20 is detached.

In conclusion, for the electronic device 100 provided in this embodiment, the first display 20 can be directly detached from the positive direction of the electronic device 100. In this way, when the first display 20 is faulty and needs to be replaced or repaired, if the first display 20 is directly detached from a positive direction of the electronic device 100, components such as the second display 30 and the mainboard 40 do not need to be detached, and a detachment process is simple; in addition, this prevents electronic elements such as the mainboard 40 and the second display 30 from being damaged due to collision or scraping in the detachment process, thereby avoiding high repair costs. In addition, after repair of the first display 20 is completed, only the first display 20 needs to be reassembled, and the mainboard 40 and the second display 30 do not need to be reassembled, and a reassembly process is simple. In addition, because only a few components need to be reassembled, this reduces a possibility that mounting precision between reassembled components is reduced, and there is no need to comprehensively detect a function of the reassembled electronic device 100.

Figure 11:
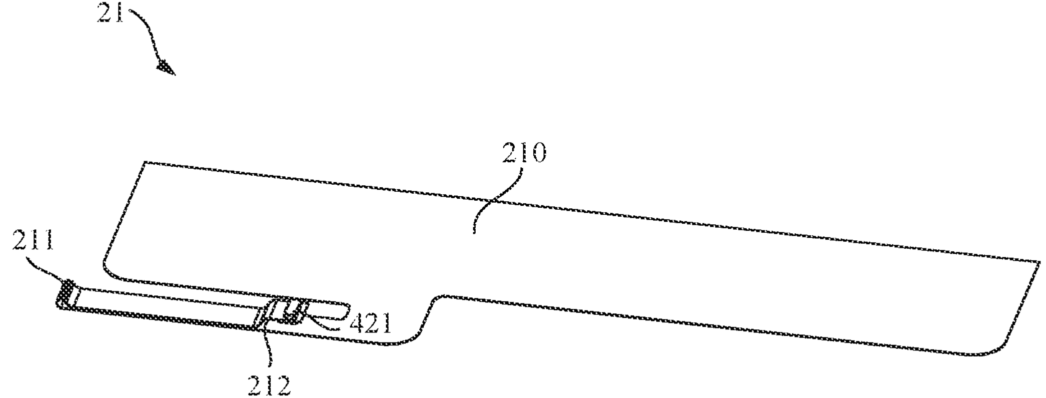
FIG. 11 is a schematic diagram of a structure of a first flexible printed circuit board of an electronic device according to an embodiment of this application.

FIG. 11 schematically shows a three-dimensional structure of the first flexible printed circuit board 21. In the foregoing embodiment, the first flexible printed circuit board 21 may include at least a bent segment 211 and a connection segment 212 that are connected. One end that is of the bent segment 211 and that is away from the connection segment 212 is connected to a non-display surface of the first display 20, the connection segment 212 extends between the first display 20 and the mainboard 40, and the connection segment 212 is connected to the first surface 401 of the mainboard 40. The bent segment 211 and a surface that is of the first display 20 and that faces the mainboard 40 may be connected in a bonding manner. A bent shape of the bent segment 211 is not limited. For example, the bent segment 211 may have a bent angle (not shown in the figure), that is, the bent segment 211 is in a bent line shape, or in the example shown in FIG. 11, the bent segment 211 may also be arc-shaped, and the bent segment 211 in the arc shape does not have a sharp angle, so as to avoid stress concentration at the bent angle of the bent segment 211. It may be understood that at least one bend may be formed on the bent segment 211. That is, in some embodiments, the bent segment 211 may have a plurality of bends, and bent shapes and bent angles of the plurality of bends may be the same or different.

It should be noted herein that because the first flexible printed circuit board 21 has a bent segment 211, the bent segment 211 can be bent and extend, so that a redundant part is formed on the first flexible printed circuit board 21, and the redundant part can extend and be bent. Therefore, in a process of detaching the first display 20, when the first display 20 is moved in a positive direction of the electronic device 100 to move away from the mainboard 40, the bent segment 211 can extend with movement of the first display 20, so that a pulling force of the first display 20 on the first flexible printed circuit board 21 directly acts on a connection point between the connection segment 212 and the mainboard 40, thereby preventing the mainboard 40 from being pulled when the first display 20 is detached.

A structure of the second flexible printed circuit board 31 may be the same as a structure of the first flexible printed circuit board 21. That is, for the structure of the second flexible printed circuit board 31, refer to the structure of the first flexible printed circuit board 21. In FIG. 7 and FIG. 10, the second flexible printed circuit board 31 may also include a mounting segment 311 and a bent segment 310 that are connected. One end that is of the bent segment 310 and that is away from the mounting segment 311 is connected to a non-display surface of the second display 30, and one end that is of the mounting segment 311 and that is away from the bent segment 310 is connected to a second surface 402 of the mainboard 40. Therefore, when the second display 30 is detached, a redundant part of the second flexible printed circuit board 31 can extend, to prevent the mainboard 40 from being pulled by the second flexible printed circuit board 31 when the second display 30 is detached.

In some embodiments, as shown in FIG. 11, the first flexible printed circuit board 21 may further include a fastening segment 210, where the fastening segment 210 is fastened to a non-display surface of the first display 20, and the fastening segment 210 is connected to one end that is of the bent segment 211 and that is away from the connection segment 212. By disposing the fastening segment 210, a connection portion between the first flexible printed circuit board 21 and the first display 20 is added, so that the first flexible printed circuit board 21 can be mounted more reliably.

The fastening segment 210 may be configured to extend along any direction, provided that the fastening segment 210 can be connected to one end of the bent segment 211. For example, the fastening segment 210 may extend along a length direction of the electronic device 100 to connect the mainboard 40, or the fastening segment 210 may extend along a width direction of the electronic device 100 to connect the mainboard 40. The fastening segment 210 and the connection segment 212 may be located on a same side of the bent segment 211, or the fastening segment 210 and the connection segment 212 may be respectively disposed on two sides of the bent segment 211.

As shown in FIG. 7 and FIG. 10, the electronic device 100 may further include a functional component 90. The functional component 90 is mounted on the middle plate 14, the functional component 90 and the mainboard 40 are disposed on a same side of the middle plate 14, and the functional component 90 and the mainboard 40 are disposed side by side along the length direction of the electronic device 100. The functional component 90 may be a speaker, and the electronic device 10) has a sound generation function. Alternatively, the functional component 90 may be a camera, and the electronic device 100 has a photographing function. In a process of assembling the electronic device 100, there may be no mounting sequence between the functional component 90 and the mainboard 40. The functional component 90 may be mounted on the middle plate 14 after the mainboard 40 is mounted on the middle plate 14, or the functional component 90 may be mounted on the middle plate 14 before the mainboard 40 is mounted on the middle plate 14.

A thickness of the middle plate 14 may be the same everywhere, or thicknesses of at least two positions of the middle plate 14 may be different. In the example shown in FIG. 8, thicknesses of all parts of the middle plate 14 are not completely the same, so that a first recess 141 is formed on the middle plate 14. Both the mainboard 40 and the functional component 9) are mounted in the first recess 141, and a projection of the first recess 141 on the middle plate 14 is slightly larger than projections of the mainboard 40 and the functional component 90 on the middle plate 14, so that a size of the first recess 141 can match sizes of the mainboard 40 and the functional component 90 that are disposed side by side. Therefore, mounting positions of the mainboard 40 and the functional component 90 can be identified accurately.

When the mainboard 40 and the first display 20 are disposed on a same surface that is of the middle plate 14, a first recess 141 is formed on a surface that is of the middle plate 14 and that faces the first display 20, and the functional component 90 is correspondingly disposed on a side that is of the middle plate 14 and that faces the first display 20. In this embodiment, the opening 140 may be aligned with only a part that is of the mainboard 40 and that is connected to the first flexible printed circuit board 21, to reduce a size of the opening 140 as much as possible, thereby ensuring that the middle frame 10 has relatively high strength to stably carry the mainboard 40 and the functional component 90.

When the mainboard 40 and the second display 30 are disposed on a same side of the middle plate 14, a first recess 141 is formed on a surface that is of the middle plate 14 and that faces the second display 30, and the functional component 90 is correspondingly disposed on a side that is of the middle plate 14 and that faces the second display 30. In this embodiment, as shown in FIG. 8 and FIG. 10, the opening 140 may alternatively be aligned with the functional component 90. In this case, a protruding portion 91 may protrude from a surface that is of the functional component 90 and that faces the first display 20, and the protruding portion 91 may extend from the opening 140 to a side that is of the middle plate 14 and that faces the first display 20, and the first display 20 can directly or indirectly support the protruding portion 91 to provide support for the functional component 90. In this example, if the opening 140 is a rectangle or a rounded rectangle, and the opening 140 extends along a length direction of the electronic device 100, compared with the circular opening 140, the opening 140 can be as small as possible while being aligned with the functional component 90 and the mainboard 40, thereby ensuring that the middle frame 10 has a relatively high strength to stably carry the mainboard 40 and the functional component 90. It may be understood that, when the opening 140 is aligned with both the mainboard 40 and the functional component 90, the connection segment 212 of the first flexible printed circuit board 21 may completely face the opening 140.

Figure 12:
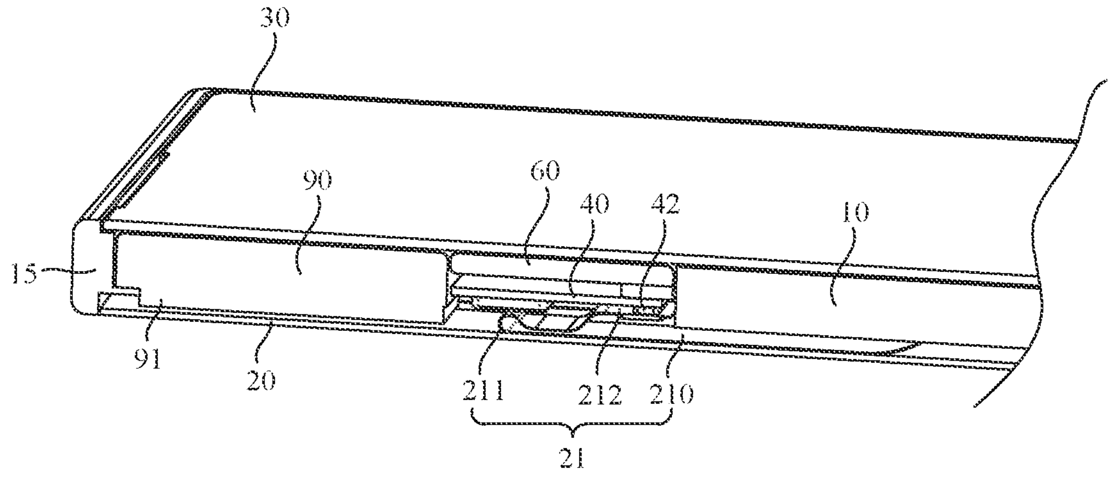
FIG. 12 is a schematic sectional view of an electronic device taken along a direction L-L in FIG. 4 according to another embodiment of this application.

Regardless of whether the mainboard 40 and the functional component 90 are disposed on a side that is of the mainboard 40 and that faces the first display 20 or a side that is of the mainboard 40 and that is away from the first display 20, a positional relationship between the first flexible printed circuit board 21 and the first display 20 and the mainboard 40 may be as follows:

In a first case, as shown in FIG. 12, the entire first flexible printed circuit board 21 may be disposed between the first display 20 and the mainboard 40. FIG. 12 schematically shows another cross-sectional structure of an electronic device 100 along a direction L-L in FIG. 4. In this case, if the first flexible printed circuit board 21 includes only the connection segment 212 and the bent segment 211, both the connection segment 212 and the bent segment 211 are located between the first display 20 and the mainboard 40. If the first flexible printed circuit board 21 further includes a fastening segment 210, the connection segment 212, the bent segment 211, and the fastening segment 210 are all located between the first display 20 and the mainboard 40. In this case, the functional component 90 may be in direct contact with a non-display surface of the first display 20, and the functional component 90 and the first display 20 support each other.

Figure 13:
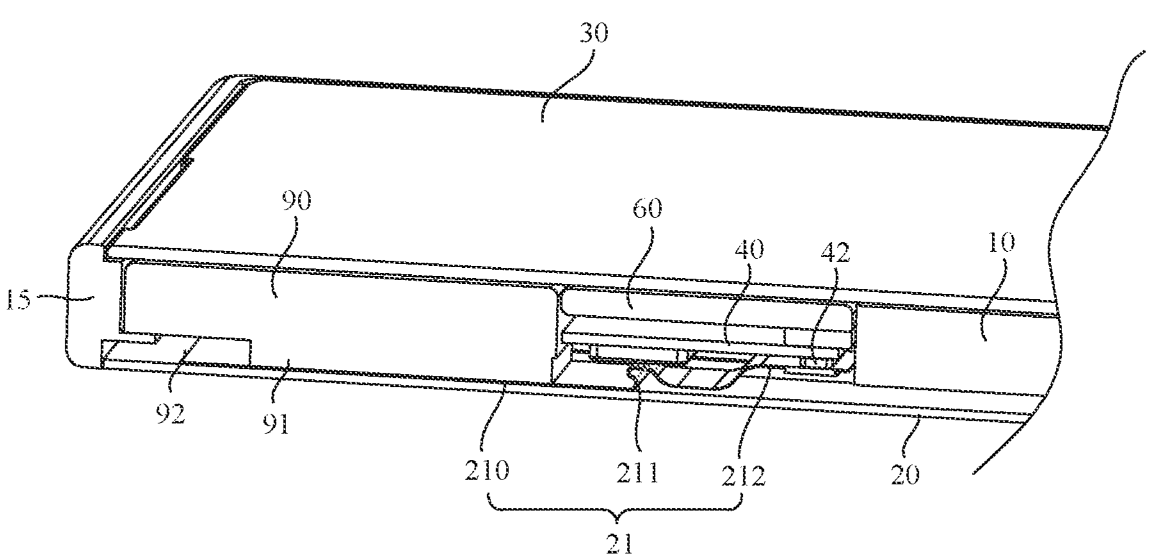
FIG. 13 is a schematic sectional view of an electronic device taken along a direction L-L in FIG. 4 according to still another embodiment of this application.

In a second case, as shown in FIG. 13, when the first flexible printed circuit board 21 further includes a fastening segment 210, and the fastening segment 210 and the connection segment 212 are located on different sides of the bent segment 211, the connection segment 212 and the bent segment 211 may be located between the first display 20 and the mainboard 40, and the fastening segment 210 may extend between the functional component 90 and the first display 20. In this case, the functional component 90 may abut on a surface that is of the fastening segment 210 and that faces the mainboard 40. FIG. 13 schematically shows still another cross-sectional structure of an electronic device 100 along a direction L-L in FIG. 4.

In a third case, as shown in FIG. 9, parts of the bent segment 211 and the connection segment 212 are disposed between the functional component 90 and the first display 20, and the other part of the connection segment 212 is disposed between the first display 20 and the mainboard 40. In this way, the first flexible printed circuit board 21 is not limited between the mainboard 40 and the first display 20, and can extend in a larger space.

In this example, when the first flexible printed circuit board 21 further includes a fastening segment 210, if the fastening segment 210 and the connection segment 212 are located on different sides of the bent segment 211, the fastening segment 210 may extend between the functional component 90 and the first display 20. Referring to FIG. 13, if the fastening segment 210 and the connection segment 212 are located on a same side of the bent segment 211, a part of the fastening segment 210 may be located between the mainboard 40 and the first display 20, and the other part of the fastening segment 210 may be located between the functional component 90 and the first display 20.

Apart of the functional component 90 may be further configured to be jointly enclosed, with the first display 20, into an avoidance groove 92 for accommodating the bent segment 211, to prevent interference between the bent segment 211 and the functional component 90. In the example shown in FIG. 9, the functional component 90 is provided with a protruding portion 91. A surface that is of the functional component 90 and that faces the first display 20 and the protruding portion 91 may jointly define a step surface. The step surface and the first display 20 are jointly enclosed into an avoidance groove 92, and the avoidance groove 92 is formed on the other side that is of the protruding portion 91 and that is away from the mainboard 40. In this case, the connection segment 212 extends between the mainboard 40 and the first display 20, from the protruding portion 91 and the first display 20, and the protruding portion 91 of the functional component 90 abuts on a surface that is of the connection segment 212 and that is away from the first display 20. In addition, if the first flexible printed circuit board 21 further includes a fastening segment 210, and the fastening segment 210 and the connection segment 212 are located on a same side of the bent segment 211, the fastening segment 210 is connected to a non-display surface of the first display 20, and the connection segment 212 and the fastening segment 210 are sandwiched between the functional component 90 and the first display 20.

Certainly, in another embodiment, the avoidance groove 92 may alternatively be disposed on a side that is of the functional component 90 and that is close to the mainboard 40, so that the avoidance groove 92 can be connected to a space between the mainboard 40 and the first display 20. In this case, the functional component 90 may be directly in contact with a non-display surface of the first display 20.

Figure 14:
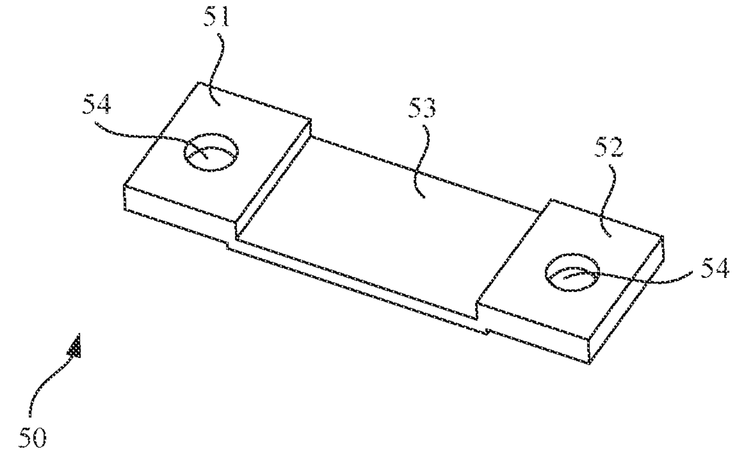
FIG. 14 is a schematic diagram of a structure of a locking bracket of an electronic device according to an embodiment of this application.

FIG. 14 schematically shows a three-dimensional structure of a locking bracket 50. In some examples of this application, referring to FIG. 10 and FIG. 14, the electronic device 100 may further include a locking bracket 50, where the locking bracket 50 is disposed between the mainboard 40 and the first display 20, the locking bracket 50 is detachably connected to the middle frame 10, and is in contact with a surface that is of the connection segment 212 and that is away from the mainboard 40. In this way, the locking bracket 50 can press the connection segment 212, to prevent the first flexible printed circuit board 21 from loosening from the mainboard 40.

Figure 15:
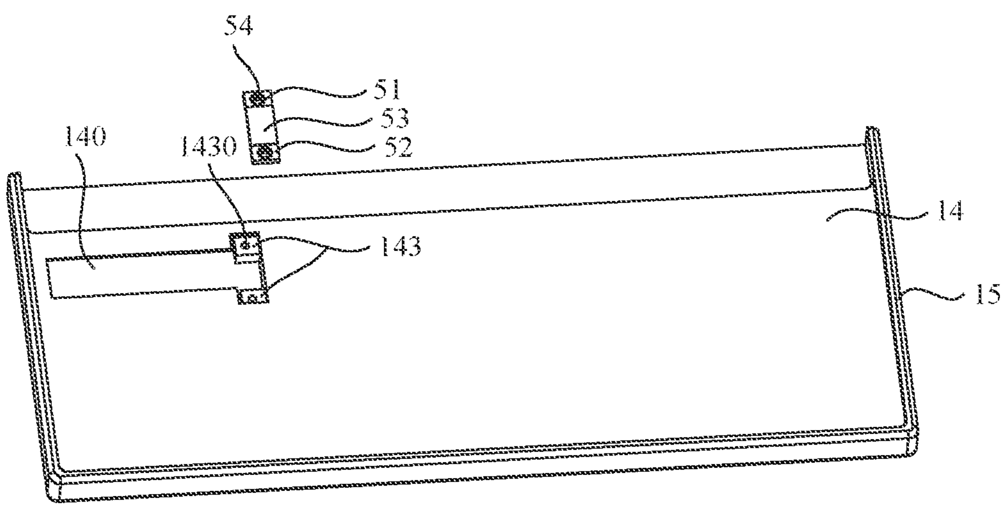
FIG. 15 is a schematic diagram of breakdown of a locking bracket and a middle frame according to an embodiment of this application.

An extension direction of the locking bracket 50 is perpendicular to an extension direction of the connection segment 212, so that the connection segment 212 can be attached to the locking bracket 50, and then can be pressed by the fastened bracket 50. FIG. 15 schematically shows breakdown structures of a locking bracket 50 and a middle frame 10. Referring to FIG. 10 and FIG. 15, an example in which the opening 140 is a rectangle is used for description. The rectangular opening 140 extends along a length direction of the electronic device 100. Correspondingly, the locking bracket 50 may extend along a width direction of the electronic device 100, and two ends of the locking bracket 50 extend to two sides of the opening 140, so that the locking bracket 50 crosses the opening 140, and a part of the locking bracket 50 can face the opening 140, and then the locking bracket 50 can face a part that is of the mainboard 40 and that is connected to the first flexible printed circuit board 21. In this design, one end that is of the connection segment 212 and that is away from the bent segment 211 may extend to the opening 140, and may be inserted between the mainboard 40 and the locking bracket 50.

For example, the first flexible printed circuit board 21 may be connected to the mainboard 40 by using the connector 42. The connector 42 may be, for example, a board-to-board connector 42 (board to board; BTB). The connector 42 includes a male socket 421 and a female socket 420 (as shown in the following FIG. 17*a*). The male socket 421 is disposed on a non-display surface of the first flexible printed circuit board 21, the female socket 420 is disposed on a first surface 401 of the mainboard 40, and the female socket 420 may be inserted into the male socket 421, so that the first flexible printed circuit board 21 is electrically connected to the mainboard 40. Specifically, a clamping gap may be defined between the locking bracket 50 and the mainboard 40, and the first flexible printed circuit board 21, the male socket 421, and the female socket 420 are clamped in the clamping gap. In this way, a joint between the first flexible printed circuit board 21 and the mainboard 40 may be clamped in the clamping gap, to prevent the male socket 421 of the connector 42 from being separated from the female socket 420, so that a connection between the first flexible printed circuit board 21 and the mainboard 40 is more reliable.

Herein, when the mainboard 40 and the second display 30 are located on a same side, the locking bracket 50 may be connected to a surface that is of the middle plate 14 and that faces the first display 20, so that the locking bracket 50 is located on a side that is of the middle plate 14 and that faces the first display 20.

Alternatively, as shown in FIG. 15, a first mounting base 143 and a second mounting base 143 protrude from a surface that is of the middle plate 14 and that faces the second display 30, and projections of the first mounting base 143 and the second mounting base 143 on the middle plate 14 are located in the opening 140. In addition, the locking bracket 50 may be accommodated in the opening 140, and two ends of the locking bracket 50 are detachably connected to the first mounting base 143 and the second mounting base 143, respectively. Therefore, compared with a manner in which the locking bracket 50 is connected to the surface that is of the middle plate 14 and that faces the first display 20, the locking bracket 50 in this embodiment can mounted in the opening 140, to avoid a relatively large gap between the first display 20 and the middle plate 14 because the locking bracket 50 protrudes from the surface of the middle plate 14, thereby improving utilization of the space. The first mounting base 143 may be a plate-like structure, or may be a block-like structure. This is not limited in this embodiment.

The locking bracket 50 may be a flat plate-like structure. Alternatively, as shown in FIG. 14, the locking bracket 50 may include a first plate body 51, a second plate body 52, and a middle plate body 53 located between the first plate body 51 and the second plate body 52. Two ends of the middle plate body 53 are respectively connected to the first plate body 51 and the second plate body 52, and a surface of the middle plate body 53 is different from surfaces of the first plate body 51 and the second plate body 52, so that a groove is formed on a surface that is of the locking bracket 50 and that faces the mainboard 40. In this way, on a basis that the locking bracket 50 is mounted in the opening 140, a clamping gap can be enlarged as much as possible, so that the connector 42 and the connection segment 212 can be clamped in the clamping gap.

With reference to the foregoing description, it is easy to understand that when the mainboard 40 and the first display 20 are located on a same side, the first mounting base 143 and the second mounting base 143 protrude from a surface that is of the middle plate 14 and that faces the first display 20, and two ends of the locking bracket 50 are connected to the first mounting base 143 and the second mounting base 143.

In some embodiments, each of the first mounting base 143 and the second mounting base 143, and the middle plate 14 may form an integrated component by using an integrated molding process. Therefore, steps of assembling the first mounting base 143 and the second mounting base 143 may be omitted, thereby improving assembly efficiency. In addition, strength of the middle plate 14 may be improved without increasing costs.

A manner of detachable connection between the locking bracket 50 and the middle frame 10 is not limited to a screw connection, or may be a connection manner such as clamping. Referring to FIG. 8, FIG. 14, and FIG. 15, for example, a screw hole 1430 is disposed on each of the first mounting base 143 and the second mounting base 143, and through holes 54 are disposed on two ends of the locking bracket 50. A screw hole 1430 of the first mounting base 143 is coaxial with a through hole 54 of one end of the locking bracket 50, and a screw hole 1430 of the second mounting base 143 is coaxial with a through hole 54 of the other end of the locking bracket 50. A screw may be connected to the screw hole 1430 after passing through the through hole 54, so that the locking bracket 50 is connected to the first mounting base 143 by using the screw.

Alternatively, the second flexible printed circuit board 31 may be electrically connected to the second surface 402 of the mainboard 40 by using the connector 42. Specifically, a female socket 420 is disposed on the second surface 402 of the mainboard 40, and a male socket 421 that can be inserted into the female socket 420 is disposed on a surface that is of the second flexible printed circuit board 31 and that faces the mainboard 40, so that the second flexible printed circuit board 31 is electrically connected to the mainboard 40.

Still referring to FIG. 7, FIG. 9, FIG. 12, and FIG. 13, when the mainboard 40 and the second display 30 are disposed on a same side of the middle plate 14, the electronic device 100 may further include a cover plate 60, where the cover plate 60 is disposed between the mainboard 40 and the second display 30, and the cover plate 60 presses the second surface 402 of the mainboard 40. With such arrangement, the cover plate 60 can prevent the mainboard 40 from abutting on the second display 30, to ensure that the second display 30 and the middle frame 10 are reliably connected. In addition, the cover 60 can press a joint between the second display 30 and the mainboard 40, to prevent loosening of the connector 42 between the second display 30 and the mainboard 40, so that a connection between the second flexible printed circuit board 31 and the mainboard 40 is more reliable. It should be noted that, in this embodiment, referring to the following FIG. 17*d* and FIG. 17*e*, the mounting segment 311 of the second flexible printed circuit board 31 can extend from a gap between the frame 10 and the cover plate 60 into the mainboard 40 and the cover plate 60, to connect the mainboard 40. In this case, the second flexible printed circuit board 31 surrounds an edge of a side of the cover plate 60. In an alternative embodiment, a via hole (not shown in the figure) may further be disposed on the cover plate 60, and a mounting segment 311 of the second flexible printed circuit board 31 may extend between the mainboard 40 and the cover plate 60 through the via hole.

Referring to FIG. 4, FIG. 5, and FIG. 7, on the basis of any one of the foregoing embodiments, the electronic device 100 may further include a rear cover 80, and the rear cover 80 is disposed on a side that is of the middle plate 14 and that faces the second display 30. When the electronic device 100 cannot be folded, the rear cover 80 may be mounted on the other side of the middle frame 10, and the second display 30 may be mounted on the rear cover 80. In this case, a size of the second display 30 may be smaller than a size of the first display 20. When the electronic device 100 can be folded, the middle frame 10 may include, for example, a first structural member 11 and a second structural member 12, and the second display 30 and the rear cover 80 may be mounted on the first structural member 11 and the second structural member 12, respectively. When the electronic device 100 is in an unfolded state, the first structural member 11 and the second structural member 12 can rotate to a same plane, and correspondingly, the rear cover 80 and the second display 30 are also located on a same plane.

As shown in FIG. 7 and FIG. 10, the electronic device 100 may further include a battery 70. The battery 70 and the mainboard 40 are disposed on a same side of the middle plate 14, and the battery 70 is electrically connected to the mainboard 40 to supply power to the mainboard 40. In FIG. 8, thicknesses of all parts of the middle plate 14 are not completely the same, so that a first recess 141 is formed on the middle plate 14, and a second recess 142 is also formed on the middle plate 14, where the battery 70 is mounted in the second recess 142. When the middle frame 10 includes the first structural member 11 and the second structural member 12, the second recess 142 may be formed on the first structural member 11. Correspondingly, similar to the mainboard 40, the battery 70 is also disposed between the second display 30 and the first display 20. Alternatively, the second recess 142 may be formed on the second structural member 12. Correspondingly, the battery 70 is disposed between the first display 20 and the rear cover 80. In this case, the rear cover 80 may also be referred to as a cover of the battery 70.

Figures 16A, 16B:
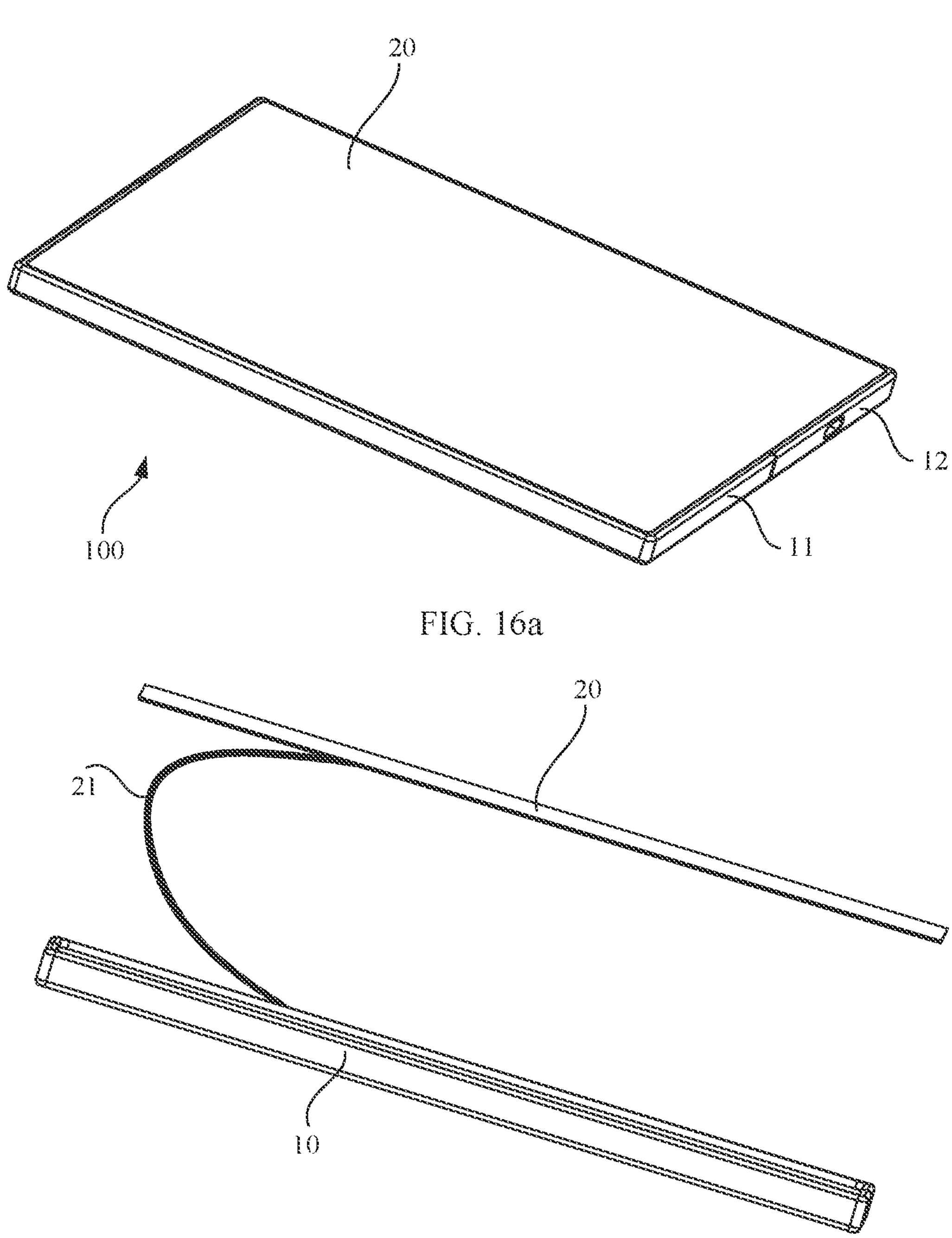
FIG. 16*a* to FIG. 16*d* are schematic diagrams showing a detachment process of a first display of an electronic device according to an embodiment of this application.

FIG. 16*a* to FIG. 16*d* schematically show a detachment process of a first display 20 of an electronic device 100. In the foregoing embodiment, when the first display 20 needs to be repaired or replaced due to crack, scraping, poor contact, or another reason, another example of the detachment process of the first display 20 may be as follows:

As shown in FIG. 16*a*, the electronic device 100 is first provided, and the first display 20 faces a direction in which the user is located, to facilitate subsequent detachment.

As shown in FIG. 16*b*, a connection relationship between the first display 20 and the middle frame 10 is released, and the first display 20 is moved in a positive direction of the electronic device 100 to move away from the mainboard 40. In this process, the first flexible printed circuit board 21 has a redundant part, and the redundant part can extend with movement of the first display 20, to alleviate a pulling force on the first flexible printed circuit board 21, thereby preventing the mainboard 40 from being pulled.

Figure 16C:
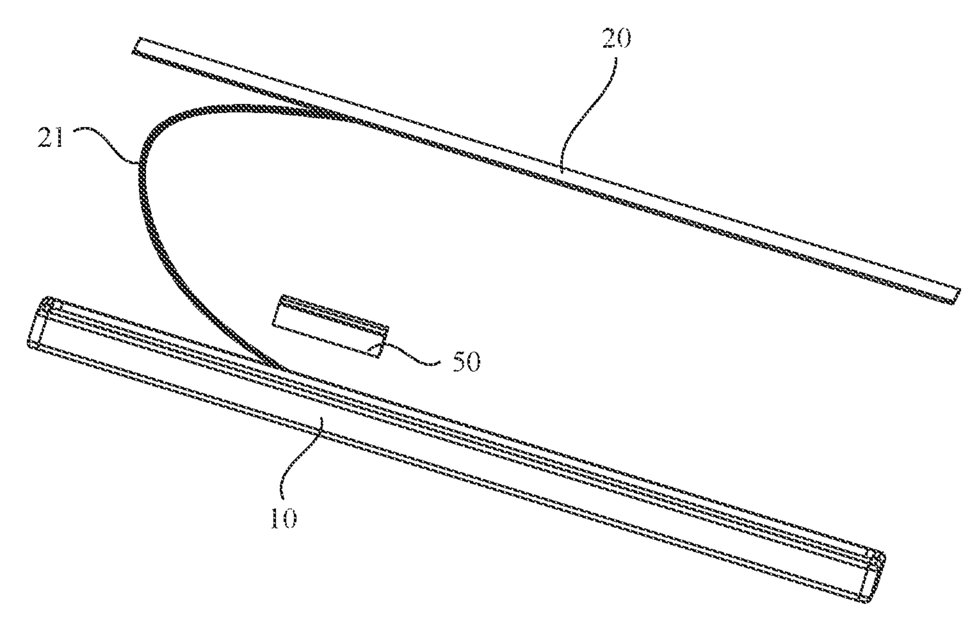

As shown in FIG. 16*c*, screws connecting the locking bracket 50 to both the first mounting base 143 and the second mounting base 143 are tightened, so that the locking bracket 50 is detached.

Figure 16D:
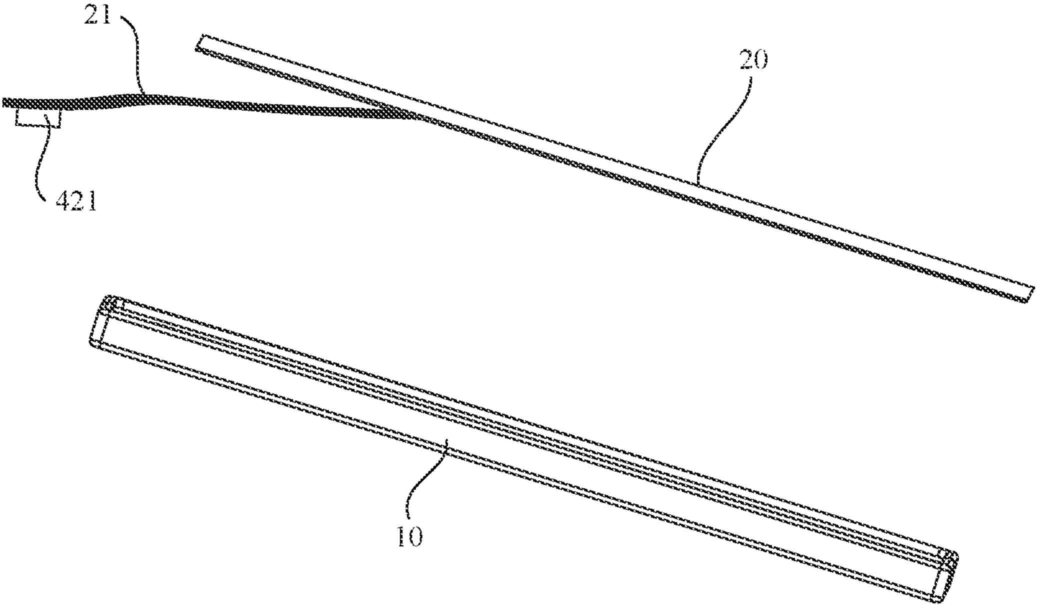

As shown in FIG. 16*d*, a force is exerted on the connection segment 212 of the first flexible printed circuit board 21, so that the male socket 421 of the connector 42 is released from the female socket 420, and then the first flexible printed circuit board 21 is disengaged from the mainboard 40, so that the first display 20 is detached.

It may be understood that, after repair of the first display 20 is completed, an assembly sequence of a reassembly process of the first display 20 may be reverse to a detachment process of the first display 20. Specifically, an example of the reassembly process of the first display 20 is as follows: First, the male socket 421 on the first flexible printed circuit board 21 is buckled with the female socket 420 on the mainboard 40, and the male socket 421 and the female socket 420 jointly form the connector 42, so that the first flexible printed circuit board 21 is connected to the mainboard 40; then the locking bracket 50 is detachably connected to the middle frame 10, so that a joint between the first flexible printed circuit board 21 and the mainboard 40 is pressed by the locking bracket 50; then the first display 20 is moved to make the first display 20 opposite to the middle plate 14; and then the first display 20 is connected to the middle plate 10, to complete reassembly of the first display 20.

The following describes an assembly process of an electronic device 100 provided in embodiments of this application.

Figure 17A:
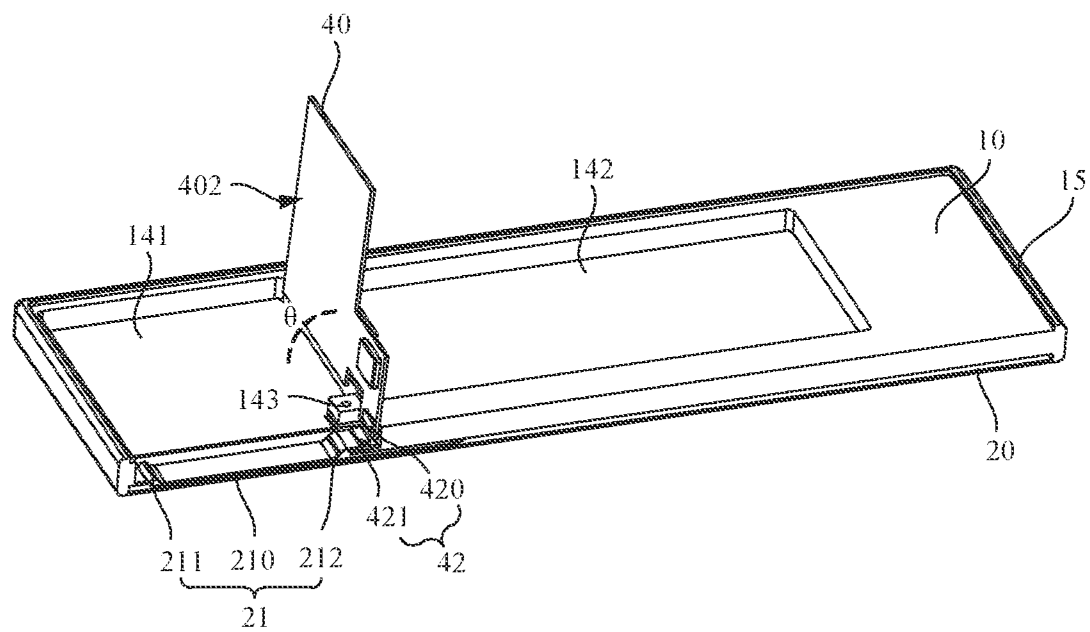
FIG. 17*a* to FIG. 17*e* are schematic diagrams showing an assembly process of an electronic device according to an embodiment of this application.
Figure 17B:
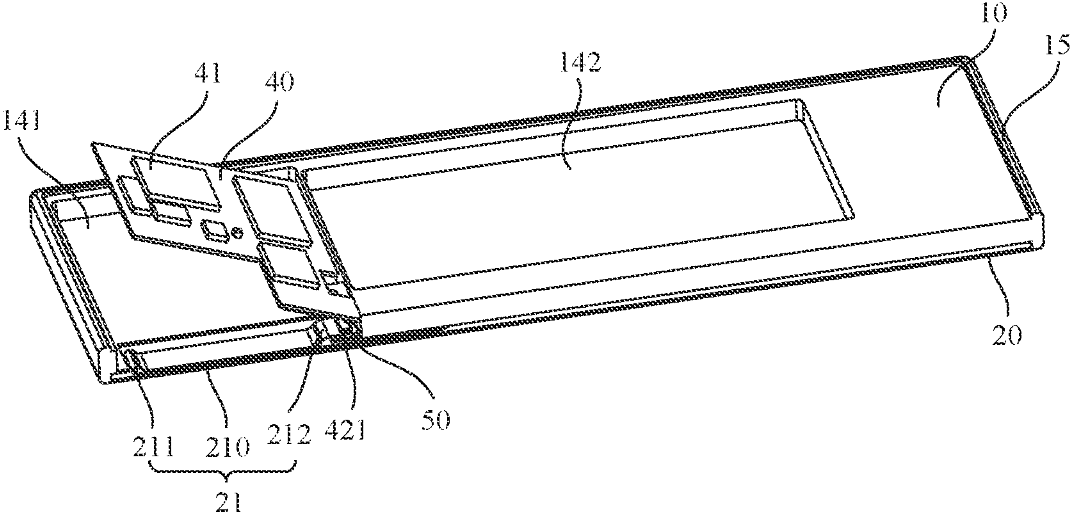
Figure 17C:
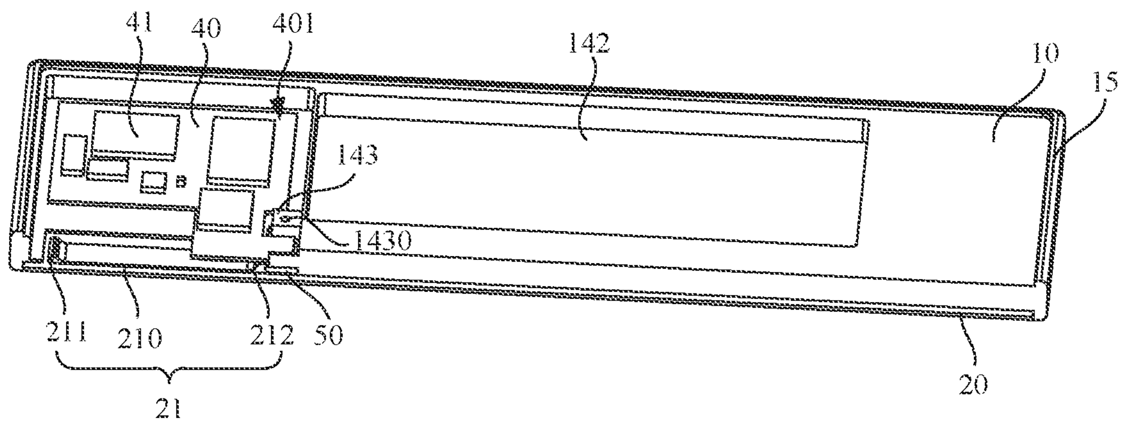

FIG. 17*a* to FIG. 17*e* schematically show an assembly process of an electronic device 100. An example in which the mainboard 40 and the second display 30 are located on a same side of the middle plate 14 is used. An example of the assembly process of the electronic device 100 provided in this embodiment is as follows:

As shown in FIG. 17*a*, first, the locking bracket 50 is connected to the middle frame 10, and then the first display 20 is moved to a side of the middle frame 10, so that the first display 20 is opposite to the middle plate 14, and one end that is of the connection segment 212 and that is away from the bent segment 211 is attached to the locking bracket 50; and the mainboard 40 is moved to a side that is of the first display 20 and that faces the middle frame 10, so that a preset included angle θ exists between the first surface 401 of the mainboard 40 and a surface that is of the middle plate 14 and that is away from the first display 20; and then, as shown in FIG. 17*b* and FIG. 17*c*, the mainboard 40 is rotated until the mainboard 40 is in contact with the middle plate 14. In this case, a part that is of the mainboard 40 and that corresponds to the first display 20 is aligned with the opening 140, and the female socket 420 on the mainboard 40 is buckled with the male socket 421 on the connection segment 212, so that the mainboard 40 is connected to the first display 20. Herein, a preset angle may be greater than or equal to 45 degrees and less than or equal to 120 degrees. When the preset angle is 90 degrees, the mainboard 40 is first erected vertically during mounting.

Figure 17D:
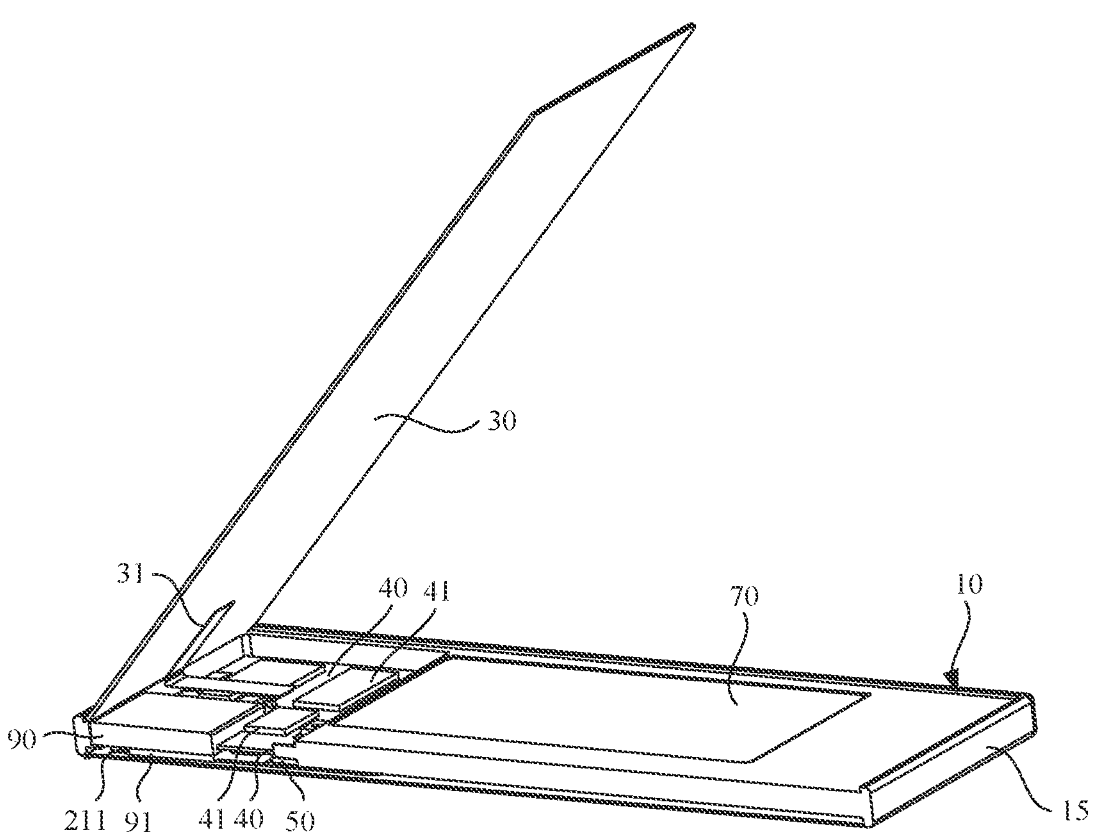

As shown in FIG. 17*d*, the functional component 90 is mounted in the first recess 141, and the battery 70 is mounted in the second recess 142; and then the second display 30 is moved to the other side of the middle frame 10, so that the mounting segment 311 of the second flexible printed circuit board 31 is connected to the second surface 402 of the mainboard 40. Because the second flexible printed circuit board 31 also has a redundant part, the second flexible printed circuit board 31 can extend to enable the second display 30 to be inclined to the middle plate 14, and a space can be provided between the second display 30 and the middle plate 14, so that another part can perform a mounting operation in the space.

Figure 17E:
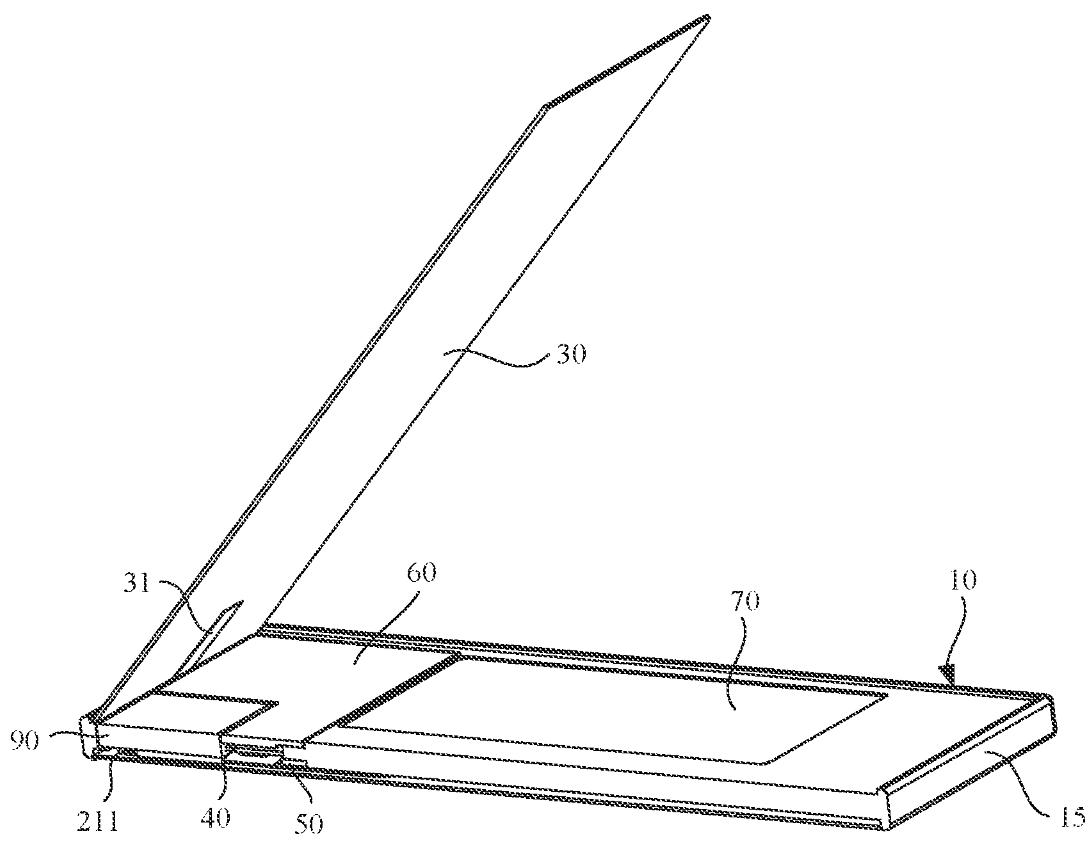

As shown in FIG. 17*e*, the cover plate 60 is mounted on a side that is of the mainboard 40 and that is away from the first display 20, so that the cover plate 60 covers on the mainboard 40; then the second display 30 is moved to make the second display 30 face the middle plate 14, and then the second display 30 is connected to the middle plate 10, to complete mounting of the electronic device 100.

In the descriptions of embodiments of this application, it should be noted that unless otherwise specified and defined explicitly, the terms "mount", "connected to" and "connect" should be understood in a broad sense, and for example, may be a fixed connection or an indirect connection by using an intermediate medium, or may be internal communication between two elements or an interaction relationship between two elements. A person of ordinary skill in the art can understand specific meanings of the foregoing terms in embodiments of this application based on a specific situation.

The device or element referred to in or implied in embodiments of this specification needs to have a specific orientation, be constructed and operated in a specific orientation, and therefore cannot be construed as a limitation on embodiments of this specification. In the descriptions of embodiments of this application. "a plurality of" means two or more, unless otherwise specifically defined.

In the specification of embodiments, claims, and accompanying drawings of this application, the terms "first", "second", "third", "fourth", and the like (if existent) are intended to distinguish between similar objects but do not necessarily indicate a specific order or sequence. It should be understood that the data termed in such a way is interchangeable in proper circumstances, so that embodiments described herein can be implemented in orders except the order illustrated or described herein. In addition, the terms "include" and "have", and any variations thereof are intended to cover non-exclusive inclusions. For example, a process, a method, a system, a product, or a device that includes a series of steps or units is not necessarily limited to those steps or units that are clearly listed, but may include other steps or units that are not clearly listed or are inherent to the process, method, product, or device.

The term "a plurality of" in this specification refers to two or more. The term "and/or" in this specification describes only an association relationship for describing associated objects and represents that three relationships can exist. For example, "A and/or B" can represent the following three cases: Only A exists, both A and B exist, and only B exists. In addition, the character "/" in this specification usually indicates an "or" relationship between the associated objects. In a formula, the character "/" indicates that the associated objects are in a "division" relationship.

It can be understood that various numeric numbers used in embodiments of this application are merely described for easy differentiation, and are not intended to limit the scope of embodiments of this application.

What is claimed is:

1. An electronic device, comprising:

a middle frame, comprising:

a middle plate having an opening disposed thereon; and a frame connected to a circumferential edge of the middle plate;

a first display disposed on a first side of the middle plate;

a second display disposed on a second side of the middle plate, the second side opposite to the first side such that respective backs of the first and second displays are facing and respective fronts of the first and second displays face in opposite directions;

a mainboard mounted on the middle plate and facing the opening;

a first flexible printed circuit board having one end connected to a surface of the first display that faces the middle plate, and having another end that extends between the first display and the mainboard and is electrically connected to a surface of the mainboard that faces the first display; and a second flexible printed circuit board having one end connected to a surface of the second display that faces the middle plate, and having another end that extends between the second display and the mainboard and is electrically connected to a surface of the mainboard that faces the second display.

2. The electronic device of claim 1, further comprising a locking bracket disposed between the mainboard and the first display, wherein the locking bracket is detachably connected to the middle frame, and the locking bracket is in contact with a surface of the first flexible printed circuit board that faces the first display.

3. The electronic device of claim 2, further comprising a first mounting base and a second mounting base that protrude from the middle plate, wherein the first mounting base and the second mounting base are disposed on two sides opposite to the opening, and two ends of the locking bracket are detachably connected to the first mounting base and the second mounting base, respectively.

4. The electronic device of claim 3, wherein each of the first mounting base and the second mounting base, and the middle plate form an integrated component by an integrated molding process.

5. The electronic device of claim 2, wherein the first flexible printed circuit board is connected to the surface of the mainboard that faces the first display by a connector that comprises a male socket and a female socket, wherein the male socket is disposed on a surface of the first flexible printed circuit board that faces the mainboard, the female socket is disposed on the surface of the mainboard that faces the first display, and the female socket is inserted into the male socket, and wherein a clamping gap is jointly defined between the locking bracket and the mainboard, and the first flexible printed circuit board and the connector are clamped in the clamping gap.

6. The electronic device of claim 1, further comprising a cover plate disposed between the mainboard and the second display, wherein the cover plate covers the mainboard.

7. The electronic device of claim 1, wherein the first flexible printed circuit board comprises a bent segment and a connection segment that are connected, one end of the bent segment that is away from the connection segment is connected to the first display, and the connection segment is electrically connected to the surface of the mainboard that faces the first display.

8. The electronic device of claim 7, wherein both the bent segment and the connection segment are located between the mainboard and the first display.

9. The electronic device of claim 7, further comprising a functional component, wherein the functional component and the mainboard are located on a same side of the middle plate, the functional component and the mainboard are disposed side by side along a length direction of the electronic device, and the bent segment and a part of connection segment are disposed between the functional component and the first display.

10. The electronic device of claim 9, wherein the mainboard and the second display are located on a same side of the middle plate, the functional component faces the opening, a protruding portion is disposed on a surface of the functional component that faces the first display, the protruding portion extends from the opening to a side of the middle plate that faces the first display, a surface of the functional component that faces the first display and the protruding portion jointly define a step surface, the step surface and the first display are jointly enclosed into an avoidance groove, and the bent segment is disposed in the avoidance groove.

11. The electronic device of claim 10, wherein the bent segment is located on a side of the protruding portion that is away from the mainboard, the connection segment extends from a position between the protruding portion and the first display to a position between the mainboard and the first display, and a surface of the connection segment that faces the mainboard is attached to the protruding portion.

12. The electronic device of claim 7, wherein the first flexible printed circuit board comprises a fastening segment, the fastening segment is connected to a surface of the first display that faces the mainboard, and the fastening segment is connected to the one end of the bent segment that is away from the connection segment.

13. The electronic device of claim 9, wherein the functional component is a camera, or the functional component is a speaker.

14. The electronic device of claim 7, wherein the bent segment is arc-shaped, or the bent segment has a bent angle.

15. The electronic device of claim 1, further comprising a battery, wherein the battery and the mainboard are disposed on a same side of the middle plate, and the battery is electrically connected to the mainboard.

16. The electronic device of claim 15, further comprising a rear cover, wherein the rear cover and the second display are located on a same side of the middle plate, and wherein the battery is disposed between the rear cover and the first display, or the battery is disposed between the first display and the second display.

17. The electronic device of claim 16, wherein the first display is a flexible display that can be folded, wherein the middle frame comprises a first structural member, a rotating assembly, and a second structural member, and wherein the first structural member is rotatably connected to the second structural member by the rotating assembly.

18. The electronic device of claim 1, wherein a thickness of the middle plate at a first position is different than a thickness of the middle plate at a second position.

19. The electronic device of claim 18, wherein the middle plate comprises a first recess, wherein the mainboard and a functional component are mounted in the first recess, and wherein the functional component comprises a speaker or a camera.

20. The electronic device of claim 19, further comprising a battery, wherein the middle plate comprises a second recess, and wherein the battery is mounted in the second recess.

* * * * *